(12) United States Patent
Alkeskjold

(10) Patent No.: US 8,406,594 B2
(45) Date of Patent: Mar. 26, 2013

(54) OPTICAL FIBER WITH RESONANT STRUCTURE OF CLADDING FEATURES CONNECTED TO LIGHT SINK

(75) Inventor: Thomas Tanggaard Alkeskjold, Jyllinge (DK)

(73) Assignee: NKT Photonics A/S, Birkerod (DK)

( * ) Notice: Subject to any disclaimer, the term of this patent is extended or adjusted under 35 U.S.C. 154(b) by 162 days.

(21) Appl. No.: 13/059,686

(22) PCT Filed: Aug. 18, 2009

(86) PCT No.: PCT/DK2009/000185
§ 371 (c)(1),
(2), (4) Date: Feb. 18, 2011

(87) PCT Pub. No.: WO2010/020251
PCT Pub. Date: Feb. 25, 2010

(65) Prior Publication Data
US 2011/0188825 A1    Aug. 4, 2011

Related U.S. Application Data

(60) Provisional application No. 61/089,757, filed on Aug. 18, 2008, provisional application No. 61/219,534, filed on Jun. 23, 2009.

(51) Int. Cl.
*G02B 6/02* (2006.01)
(52) U.S. Cl. ...................................................... 385/125
(58) Field of Classification Search .................... 385/125
See application file for complete search history.

(56) References Cited

U.S. PATENT DOCUMENTS

| | | | | |
|---|---|---|---|---|
| 5,907,652 A | * | 5/1999 | DiGiovanni et al. | 385/125 |
| 7,340,140 B1 | * | 3/2008 | Xu et al. | 385/125 |
| 8,031,999 B2 | * | 10/2011 | Goto | 385/127 |
| 8,098,970 B2 | * | 1/2012 | Galvanauskas | 385/123 |
| 2003/0165313 A1 | * | 9/2003 | Broeng et al. | 385/125 |
| 2004/0263856 A1 | * | 12/2004 | Willig et al. | 356/460 |

(Continued)

FOREIGN PATENT DOCUMENTS

| WO | WO 2007/057024 | 5/2007 |
|---|---|---|
| WO | WO 2008/126472 | 10/2008 |

OTHER PUBLICATIONS

Cerqueira S. Jr. et al., "Hybrid Photonic Crystal Fiber" Optics Express, (2006), vol. 14, No. 2, pp. 926-931.

(Continued)

*Primary Examiner* — Charlie Peng
(74) *Attorney, Agent, or Firm* — Buchanan Ingersoll & Rooney PC

(57) ABSTRACT

An optical fibre that use index-guidance formed with a low index cladding or a microstructured cladding using voids/holes or low index features (404) together with multiple high index resonant cladding features (1205, 1206). One to three resonant cross sectional extending structure act as a filter by resonantly coupling light out to part of the cladding (1202) or other structures (fx. a high index outer cladding ring) that acts as light sink(s) at one to three wavelength when using one to three materials or features with different size, shape, refractive index profile or normalized frequency parameter. The fibre can be asymmetrical. The fibre can be adapted for suppression of higher order modes (HOM) and/or guiding light in a narrow spectral wavelength range and act as a band pass filter. For enhancing out-coupling the high index features can be arranged along two intersecting lines tangentially positioned in relation to the core and along a line that extends from the core and intersects the tangentially positioned lines. Light absorbing material such as samarium can be used in the light sink. The fibre can be used in a fibre amplifier or fiber laser.

26 Claims, 40 Drawing Sheets

U.S. PATENT DOCUMENTS

| | | | |
|---|---|---|---|
| 2005/0069269 A1* | 3/2005 | Libori et al. | 385/125 |
| 2005/0111804 A1* | 5/2005 | Bjarklev et al. | 385/125 |
| 2005/0157998 A1* | 7/2005 | Dong et al. | 385/126 |
| 2006/0098694 A1* | 5/2006 | Hongo | 372/6 |
| 2006/0257071 A1 | 11/2006 | Bise et al. | |
| 2007/0242923 A1* | 10/2007 | Fini | 385/125 |
| 2009/0207483 A1 | 8/2009 | Goto | |

OTHER PUBLICATIONS

Fini et al., "Distributed Fiber Filter Based on Index-Matched Coupling between Core and Cladding" Optics Express, (2005), vol. 13, No. 25, pp. 10022-10033.

Goto et al., "Birefringent all-solid Hybrid Microstructured Fiber" Optics Express, (2008), vol. 16, No. 23, pp. 18752-18763.

Goto et al., "Cladding-Pumped Yb-Doped Solid Photonic Bandgap Fiber for ASE Suppression in Shorter Wavelength Region" Optical Fiber Communication/National Fiber Optic Engineers Conference, OFC/NFOEC 2008, pp. 1-3.

Mattsson, U.S. Appl. No. 61/162,483, entitle "Cladding-Pumped Optical Fiber" filed Mar. 23, 2009.

International Search Report and the Written Opinion of the International Searching Authority (Forms PCT/ISA/210 and PCT/ISA/237) dated Nov. 5, 2009, issued in the corresponding International Application No. PCT/DK2009/000185.

Invitation to Pay Additional Fees and, Where Applicable, Protest Fee (Form PCT/ISA/206) dated Sep. 18, 2009, issued in the corresponding International Application No. PCT/DK2009/000185.

* cited by examiner

2901

OPTICAL FIBER WITH RESONANT STRUCTURE OF CLADDING FEATURES CONNECTED TO LIGHT SINK

The present invention relates to an optical fiber comprising cladding features, a method of producing such a fiber, and use of such a fiber including articles comprising the fiber. More particularly, the invention relates to an optical fiber, wherein at least one of said cladding features comprises material with a refractive index above that of the cladding basis material. The introduction of such cladding features provides a tool for manipulating the optical properties, such as the spectral and the polarization properties, of the fiber. The fiber can thus be designed to provide spectral filtering, to be polarization maintaining and to have polarizing properties.

In recent years a new class of optical fibers has appeared. The optical guiding mechanism in these fibers is provided by introducing a number of features in the fibers, such as voids. These features typically run parallel with the fiber and extend all the way along the fiber length. The guiding principle may be based on index-guidance, such as in traditional optical fibers, the Photonic Band-Gap (PBG) principle, and the Anti-Resonant Reflecting Optical Waveguide (ARROW) scheme. For index-guiding fibers, the core may consist of solid material having a higher refractive index than the effective refractive index of the surrounding cladding region, which may include a number of low index features, such as voids. For fibers based on the PBG effect, the refractive index of the core is lower than the effective cladding indices. The cladding material may consist of carefully placed features with a predetermined size arranged in a predetermined pattern with a predetermined feature-to-feature distance having a refractive index higher than the core refractive index. In ARROW waveguides an optical signal may be guided in a low index core by the anti-resonant reflection from e.g. a low-index/high-index structure.

In optical fibers comprising features of higher or lower refractive index compared to a fiber basis material, the fibers optical properties are to some extent determined by the presence and nature of these features. In general, these types of optical fibers will in the following be called microstructured fibers, but they are also known as microstructured optical fibers, holey fibers, Photonic Crystal Fibers (PCFs), Photonic Band-Gap fibers, hole-assisted optical fibers, as well as other names may be used. The technology of such fibers is often referred to as the PCF technology.

The PCF technology provides a method for realizing fibers that can guide light without the need for doping parts of the fiber with dopants that either increase or decrease the refractive index of the fiber material. The PCF technology can however still be combined with the dopant based technology to provide for example high power lasers, where the fiber core may be doped with rare earth elements.

The PCF technology can be used to realize Large-Mode Area (LMA) fibers due to high index and modal control provided by the presence of cladding features, such as voids. LMA fibers may have mode field diameter (MFD) of around 13 μm or larger for 1.0 μm wavelength applications and may exhibit single-mode (SM) operation over a wide wavelength range. Due to the single-mode property of such a fiber it requires less tight coils in order to operate single-mode. This may reduce the bend-induced mode compression and decrease the optical intensity in the core, which increases the threshold for nonlinear effects.

A. Cerqueira S. Jr., F. Luan, C. M. B. Cordeiro, A. K. George, and J. C. Knight (Opt. Express 14, 926-931 (2006)) describe a hybrid photonic crystal fiber.

R. Goto et al., (OFC 2008 paper OTuJ5) describes a cladding-pumped Yb-doped solid photonic bandgap fiber for ASE suppression in the shorter wavelength region.

J. M. Fini, R. T. Bise, M. F. Yan, A. D. Yablon, and P. W. Wisk (Opt. Express 13, 10022-10033 (2005)) describe a distributed fiber filter based on index-matched coupling between core and cladding.

WO 2007/057024 A2 describes active optical fibers with wavelength selective filtering mechanism and a method of production and the use of such fibers.

R. Goto, K. Takenaga, S. Matsuo and K. Himeno, (Proceedings of the Optical Fiber Communication Conference, paper OML7, 2007) describe a solid photonic band-gap fiber with 400 nm bandwidth and a loss below 4 dB/km at a wavelength of 1520 nm.

It is often required that fibers used in amplifiers systems can operate at bend radii less than 15 cm. This bending requirement is often conflicting with the LMA single-mode property since the core light will leak out of the core at this bend radius and give reduced efficiency and make the amplifier sensitive to handling, stress and thermal fluctuations. In order to meet these bending requirements, the core Numerical Aperture (NA) may in one configuration be increased, whereby the SM property is sacrificed, in order to confine the mode better and reduce the bend loss. This configuration, however, require that the differential mode loss between the fundamental and the higher-order modes is high enough for the amplifier to operate in a single-mode. This is not without problems, since the ends of the fiber can often not be coiled tightly enough to maintain SM operation at the input and output of the fiber. This may result in pointing instability as the temperature drifts, fiber un-stresses or is perturbed by for example air flow or vibrations from fans. Furthermore, the tight coiling often reduces the effective mode area of the guided mode and this, therefore, effectively decreases the nonlinear threshold of the fiber and decreases the power handling limit of the amplifier.

The present invention provides new optical fibers with optical properties as described in the following. The optical fiber of the invention may be designed to provide spectral filtering, and/or to be polarization maintaining, and/or to have polarizing properties and/or to be higher-order mode supressing. Such fibers can find use in high-power systems, wherein it in some cases may be advantageous to avoid non-linear effects such as Stimulated Raman Scattering (SRS) and Four-Wave Mixing (FWM). The threshold for nonlinear effects decreases with increasing length of the laser and delivery fiber and is a limiting factor as the power of Continuous Wave (CW) lasers increases. In pulsed amplifiers on the other hand, the peak power is often several orders of magnitudes higher than in CW lasers, and nonlinear effects set in already at the amplifier level.

Fiber lasers can be made Polarization Maintaining (PM) or Polarizing (PZ), by placing stress applying parts (often low-index Boron) in proximity to the fiber core. These induce stress-birefringence and create a polarization maintaining fiber core. The optical fiber according to the present invention may be designed to have specific PM or PZ properties, with or without the addition of stress applying parts, while maintaining single mode properties, making them relevant for fiber lasers.

In one embodiment, the invention provides a LMA fiber design that may provide any one or more of the following aspects:
  Single-mode property.
  PM properties realized using small and low-contrast cladding features (no large-index contrast and thereby better modal control).

Spectral filtering for reducing ASE and/or SRS on short- and/or long-wavelength side of the signal wavelength.

Improved bend resistance through control of the coiling orientation.

n-fiber beam expansion.

PZ properties realized without using large stress applying parts.

The invention is not limited to strict single-mode fibers, but may also be applied to few-mode or multi-mode fibers.

One object of the present invention is to provide an optical fiber adapted for suppression of higher order modes (HOM) and/or for guiding light in a narrow spectral wavelength range. The optical fiber comprises an axial direction, a cross section perpendicular to said axial direction. The optical fiber comprises a core region extending along said axial direction, said core region being adapted to guide an optical signal; a cladding region surrounding said core region, said cladding region comprising an inner cladding region comprising an inner cladding basis material in which inner cladding features extending along said axial direction are defined. The inner cladding features comprise a plurality of said first inner cladding features comprising a plurality of first inner cladding features comprising a first material and having a first refractive index profile, a first cross sectional shape and a first normalized frequency parameter relative to said inner cladding basis material. The plurality of first inner cladding features forms a first cross sectional extending optical resonant structure connecting said core region to a first light sink.

In the context of the present invention, cladding features arranged in the inner cladding of the fiber may both be referred to as inner cladding features or as cladding features.

In the context of the present invention, the phrase "cross sectional shape" in principle refers to both the size and the shape of the (inner) cladding features. Two (inner) cladding features, that both are cylindrical shaped but with different diameters are hence said to have different shapes.

In one embodiment, the inner cladding basis material is substantially identical to the fiber basis material. In one embodiment, the inner cladding basis material differs from the fiber basis material.

The first inner cladding features may be arranged substantially along two intersecting lines tangentially positioned in relation to said core region and optionally along a first line that extends from said core region and intersects said tangentially positioned lines. The inner cladding features may further comprise a plurality of second inner cladding features comprising a second material and having a second refractive index profile, a second cross sectional shape and a second normalized frequency parameter relative to said inner cladding basis material. The plurality of second inner cladding features may form a second cross sectional extending optical resonant structure connecting said core region to a second light sink. The first and second inner cladding features may be such that the first refractive index profile differs from the second refractive index profile and/or the first cross sectional shape differs from the second cross sectional shape, and/or the first normalized frequency parameter differs from the second normalized frequency parameter.

The normalized frequency parameter—also known as the V-number—depends on the wavelength of the optical signal, the radius of the high index region, and the refractive indices of the high index region and the surrounding low index region, and is given by $$V = \frac{2\pi r}{\lambda}\sqrt{n_{high}^2 - n_{low}^2}$$

wherein r is the radius of the high index region, λ is the wavelength of the optical signal, $n_{high}$ and $n_{low}$ is the effective refractive index of the high index region and low index region, respectively.

An asymmetrical sensitivity towards bending of the fiber can be achieved by providing an asymmetric fiber design. One object of the present invention is thus to provide an asymmetrical optical fiber adapted for suppression of higher order modes (HOM) and/or for guiding light in a narrow spectral wavelength range. The asymmetrical optical fiber comprises an axial direction, a cross section perpendicular to said axial direction, and a core region extending along said axial direction, said core region being adapted to guide an optical signal. The core regions is surrounded by a cladding region which comprises an inner cladding region comprising an inner cladding basis material in which inner cladding features extending along said axial direction are defined. These inner cladding features comprise a plurality of first inner cladding features comprising a first material and having a first refractive index profile, a first cross sectional shape and a first normalized frequency parameter relative to said inner cladding basis material. The plurality of first inner cladding features forms a first cross sectional extending optical resonant structure connecting the core region to a first light sink. The asymmetry of the asymmetric optical fiber may be such that there is no axis parallel to the axial direction of the fiber around which the fiber has a rotational symmetry.

One object of the present invention is to provide an optical fiber adapted for amplification of light, said optical fiber comprising an axial direction, a cross section perpendicular to said axial direction, and a core region extending along said axial direction, said core region being adapted to guide an optical signal. The core regions is surrounded by a cladding region which comprises an inner cladding region comprising an inner cladding basis material in which a plurality of inner cladding features extending along said axial direction are defined. These inner cladding features are arranged to resonantly couple in at least a first wavelength range light of one or more higher-order modes (HOM) in said core region to at least a first light sink. The plurality of inner cladding features are separated, in said cross sectional position, into at least a first group comprising first inner cladding features and a second group comprising second inner cladding features. The first inner cladding features have a first cross sectional shape and said second inner cladding features have a second cross sectional shape that may be different from said first cross sectional shape. The first inner cladding features may be substantially circular shaped and the second inner cladding features may be substantially elliptical shaped. The first and second cladding features may also differ in respect to their normalized frequency parameter, the so-called V-number, so that the normalized frequency parameter of said first inner cladding features relative to said inner cladding basis material differs from the normalized frequency parameter of said second inner cladding features relative to said inner cladding basis material. The first and second groups may have different shapes, i.e. of the perimeter of these groups may differ, such as a substantially rectangular shaped first group and a substantially elliptical shaped second group. The resonant coupling results in a suppression of said HOM by more than 3 dB/m, such as more than 10 dB/m, such as more than 19.3 dB/m, such as more than 20 dB/m. The first inner cladding features of the optical fiber adapted for amplification of light may comprise a first material and have a first refractive index profile, and the second inner cladding features may comprise a second material and have a second refractive index profile, wherein said first group comprises a first cross sectional extending optical resonant structure connecting said core region to a first light sink, and wherein said second group comprises a second cross sectional extending optical resonant structure connecting said core region to a second light sink.

The second inner cladding features may be substantially identical to said first inner cladding features. This may be the case in the embodiment, wherein the shape of the first group differs from the shape of the second group. The inner cladding features of the first and second optical resonant structures may also be substantially identical when a part of said inner cladding features are arranged tangentially in relation to the core region. In the context of the present invention, the inner cladding features are considered to be substantially identical when the maximum variation within the optical resonant structure of a parameter that describes an inner cladding feature is below 20%, such as below 15%, such as below 10%, such as below 8%, such as below 5%, such as below 2%, such as below 1%. The parameter may be the normalized frequency parameter, the geometrically averaged refractive index, the refractive index profile, and/or the cross sectional shape. Variations in the cross sectional shape between two inner cladding features may be determined by arranging them in a manner whereby their overlap is maximized. The difference in cross sectional shape is then determined as the total area of the sections of one inner cladding feature that is not matched by a section in the other inner cladding feature relative to the total cross sectional area of the one inner cladding feature. Variations in the refractive index profile between two inner cladding features may be determined by arranging them in a manner whereby their overlap is maximized or whereby the difference between the two refractive index profiles is minimized. The difference in refractive index profile is then determined by integrating over the common area the difference between the two refractive index profiles or by determining the local maximum deviation between the two curves.

The first refractive index profile may differ from the second refractive index profile and/or the first cross sectional shape may differ from said second cross sectional shape.

The first wavelength range wherein the inner cladding features couple light of one or more higher-order modes (HOM) in said core region to at least a first light sink may have a spectral width of about 10 nm, such as about 20 nm, such as 30 nm, such as about 50 nm, such as about 75 nm, such as about 100 nm, such as about 150 nm, such as about 200 nm. The central wavelength of the first wavelength range may be in the near infra red range, such as in the interval between about 800 nm and about 2400 nm, such as in the interval between about 850 nm and about 2000 nm, such as in the interval between about 900 nm and about 1600 nm, such as in the interval between about 1000 nm and about 1400 nm.

One object of the present invention is to provide a method for producing the fiber according to the present invention. The method may comprise providing a plurality of first rods comprising said first material and overcladding a part of said first rods with a tube comprising tube material. The overclad first rod with the overcladding tube is then stretched to provide second rods. A stack is made comprising at least one core rod for defining said core region and a plurality of rods for defining the inner cladding region comprising a plurality of said first and second rods. The stack may initially be drawn to a preform when a two-step drawing process is applied. The optical fiber is then drawn from said stack or from said preform. Material from said first rods define said first inner cladding features and material from said second rods define said second inner cladding features in the drawn optical fiber.

The method may comprise providing a plurality of first rods comprising said first material A stack is made comprising at least one core rod for defining said core region and a plurality of rods for defining the inner cladding region comprising a plurality of said first rods. The stack may initially be drawn to a preform when a two-step drawing process is applied. The optical fiber is then drawn from said stack or from said preform. Material from said first rods defines said first inner cladding features in the drawn optical fiber.

The method may comprise providing a plurality of first rods comprising said first material and a plurality of second rods comprising said second material. A stack is made comprising at least one core rod for defining said core region and a plurality of rods for defining the inner cladding region comprising a plurality of said first and second rods. The stack may initially be drawn to a preform when a two-step drawing process is applied. The optical fiber is then drawn from said stack or from said preform. Material from said first rods define said first inner cladding features and material from said second rods define said second inner cladding features in the drawn optical fiber.

In one embodiment, said rods of said stack are arranged in a substantially hexagonal lattice.

The optical fiber may be fabricated in various materials. For applications with optical signal in the visible or near-infrared range, optical fibers are often based on silica or polymer materials. In one embodiment, the inner cladding basis material comprises silica material. The inner cladding features may comprise inner cladding basis material doped with at least one index modifying dopant. The index modifying dopant may be selected from the group of Germanium (Ge), Phosphorous (P), Boron (B), or Fluorine (F).

The (inner) cladding features may comprise up-doped rods or up-doped elements arranged in the inner cladding basis material.

The inner cladding basis material may in principle be any optically transparent or substantially transparent material or any combinations of such materials. In one embodiment, the inner cladding basis material comprises a polymer material. The inner cladding features may comprise the polymer material doped with at least one index modifying dopant that alters the refractive index of the polymer material.

The optical fiber may further comprise a first outer cladding region surrounding at least partly said inner cladding region. The first outer cladding may have a refractive index which is higher than the effective refractive index of the inner cladding region.

In one embodiment, the first outer cladding region comprises said first and/or second light sink. The first and second light sink may be comprised within a coherent part of said first outer cladding region, such as a solid ring surrounding the inner cladding region.

The first and/or second light sink may comprise at least a first light absorbing region comprising a light absorbing medium. Light coupled from said core region to the sink(s) may then be absorbed in this region and prevented from coupling back into the core region as the light propagates further along the optical fiber. The first light absorbing region may be located at least partly in said first outer cladding region and/or at least partly in said inner cladding region. In one embodiment, the light absorbing region comprises at least one first inner cladding feature and/or at least one second inner cladding feature being doped with said light absorbing medium. If an inner cladding feature doped with light absorbing medium is located in the vicinity if the core region, so that the evanescent field of the core modes have a significant strength in the absorbing region or there is a direct modal overlap, the wavelength selectivity of the coupling of light from the core mode to the absorbing region is reduced.

In one embodiment, the inner cladding features comprising the absorbing medium may hence be located some distance away from the core region, whereby the wavelength selectivity of the resonantly coupling process is enhanced. In one embodiment, at least two substantially non-absorbing inner cladding features are arranged in between said core region and each of said inner cladding features being doped with said light absorbing medium. In the context if the present invention, the phrase "non-absorbing inner cladding features" refers to inner cladding features, wherein light at given wavelength, or in a given wavelength range, can propagate along the fiber with a low absorption, such as an absorption below about 1 dB/m, such as below about 0.5 dB/m, such as below about 0.2 dB/m, such as below about 0.1 dB/m, such as below about 0.01 dB/m, such as below about 0.001 dB/m. In one arrangement the resonant coupling of higher order modes propagating in the core region to the light sink(s) may result in a suppression of these higher order modes in the range of about 3 dB/m to about 100 dB/m, such as in the range of about 10 dB/m to about 100 dB/m, such as in the range of about 19.3 dB/m to about 100 dB/m, such as in the range of about 20 dB/m to about 100 dB/m.

In one embodiment, the light absorbing medium comprises Samarium (Sm). Sm doped silica glass absorbs light in the infrared range, and may for instance be used to absorb light from a pump laser emitting light at 1064 nm.

The first and second inner cladding features may be such that the first and second refractive index profiles are higher than the refractive index of said inner cladding basis material. In the context of the present invention the phrase "refractive index profile" includes both a uniform refractive index profile and a refractive index profile that varies over a single cladding feature. In the case of a varying refractive index profile, the phrase "higher than the refractive index of said inner cladding basis material" refers to the situation wherein the geometrically averaged refractive index of the cladding feature is higher than the refractive index of the inner cladding basis material. The inner cladding features may thus comprise a low index region, such as a void, and still have a refractive index profile which is higher than the refractive index of the inner cladding basis material.

In addition to the first and second inner cladding that provides resonant coupling to the sink(s) of the optical fiber, the optical fiber may comprise further inner cladding features. In one embodiment, the optical fiber comprises a plurality of third inner cladding features that comprise a third material and have a third refractive index profile and a third cross sectional shape.

The third inner cladding features may comprise a low index region with a refractive index below that of the inner cladding basis material. In one embodiment, the third inner cladding features comprise voids and/or a down doped inner cladding basis material. In one embodiment, the inner cladding basis material comprises a basis material that is up-doped by adding an index raising dopant, while the third inner cladding features comprise the same basis material being either un-doped, down-doped with an index lowering dopant, or up-doped to a lower extent than the inner cladding basis material. In one embodiment, the third inner cladding features comprise down-doped silica, such as F and/or B doped silica, which may be referred to as down-doped elements or down-doped rods. F-doped (inner) cladding features may also be referred to as down-doped fluorine rods.

The third inner cladding features may comprise a high index region and have a third normalized frequency parameter relative to said inner cladding basis material. In one embodiment, the third inner cladding features comprise inner cladding basis material, such as silica glass, that is up-doped by adding an index raising dopant, such as Germanium or Phosphorous.

In one embodiment, the optical fiber according to present invention comprises a plurality of fourth inner cladding features comprising a fourth material and having a fourth cross sectional shape and a fourth refractive index profile which is lower than the refractive index of said inner cladding basis material. Said fourth inner cladding features may comprise down-doped inner cladding basis material and/or voids. In one embodiment, said fourth inner cladding features are arranged to provide beam expansion of a core mode of said core region if said voids are collapsed. The collapse may result from a localized heating of said optical fiber, such as in relation to a tapering of the optical fiber.

The first and second inner cladding features may comprise regions with a refractive index below that of the inner cladding basis material. In one embodiment, at least a part of the first and/or second inner cladding features comprise a region with a refractive index above that of the inner cladding basis material surrounded by a region with a refractive index below that of the inner cladding bases material. The refractive index above and below the refractive index of the inner cladding basis material may be achieved by up-doping and down-doping, respectively, inner cladding basis material. The up-doped region may comprise silica glass doped with Germanium and/or Phosphorous, and the down-doped region may comprise a Fluorine-doped silica ring surrounding said up-doped silica glass. The cross sectional size and the doping levels of the up-doped and the down-doped regions may be arranged such that the geometrical averaged refractive index of the first and second inner cladding features is above the refractive index of the inner cladding basis material.

The first optical resonant structure and the second optical resonant structure may both be arranged to couple light from said core region to said sink(s) in at least two wavelength ranges, herein also referred to as resonant bands. When light propagating in the core region at a wavelength within the two resonant bands is resonantly coupled to e.g. an absorbing region, a transmission pass band is seen in the transmission spectrum for the fiber core region. The transmission pass band comprises the wavelengths in between the two resonant bands. At the wavelengths corresponding to the resonant bands, the transmission loss of an optical signal launched into the core region of the fiber is high. In one embodiment, the first inner cladding features are arranged to define at least a first transmission pass band in the transmission spectrum by resonantly coupling light from at least a first core mode of said core region to said first light sink in at least two resonant wavelength ranges, and/or said second inner cladding features are arranged to define at least a second transmission pass band by resonantly coupling light from at least a second core mode of said core region to said second light sink in at least two resonant wavelength ranges. When the optical fiber comprises a plurality of optical resonant structures each of which couples light away from the core outside their respective transmission pass bands, the effective transmission pass band of the optical fiber comprises the wavelength range where the transmission pass bands of the individual optical resonant structures overlap. The boundaries of the resonant bands are defined as the wavelengths at which the resonant coupling of light from the core region to the sink(s) is increased by 10 dB relative to the minimum coupling strength in the transmission pass band.

The guiding of an optical signal in the core region is the result of a confinement of the optical signal to this core region. The optical fiber may comprise in inner cladding region with an effective refractive index below that of the core region. This may be caused by the presence of a plurality of low index third inner cladding features in the inner cladding region or a down doping of the inner cladding region by doping the inner cladding basis material with an index-lowering dopant. Along the optical resonant structure(s) comprising inner cladding features, where the effective refractive index of the optical resonant structure may be higher than the (effective) refractive index of the core region, modified total internal reflection guidance is not possible. Along the optical resonant structures, the confinement only occurs in restricted wavelength bands at the anti-resonant conditions of the inner cladding features. According to the Anti-resonant Reflecting Optical Waveguide (ARROW) model, the high-index inner cladding features permit light to couple out from the core region at wavelengths where resonance occurs, but they reflect the light back into the core region at wavelength where they are anti-resonant with the light. A guided mode in the core region may in one or more wavelength ranges be confined simultaneously by modified total internal reflection from an array of air holes in the inner cladding region and by anti-resonant reflection from one or more optical resonant structures comprising inner cladding features.

The first optical resonant structure may comprise first inner cladding features having a normalized frequency parameter that is lower than the normalized frequency parameter of said second inner cladding features of said second optical resonant structure.

The first optical resonant structure may comprise first inner cladding features having an effective refractive index that is lower than the effective refractive index of said second inner cladding features of said second optical resonant structure.

The first optical resonant structure may comprise first inner cladding features having a normalized frequency parameter that is higher than the normalized frequency parameter of said second inner cladding features of said second optical resonant structure.

The first optical resonant structure may comprise first inner cladding features having an effective refractive index that is higher than the effective refractive index of said second inner cladding features of said second optical resonant structure.

Each of the first and second inner cladding features may be arranged to couple light in at least one wavelength range from said core region to said sink(s). In one embodiment the first inner cladding features are arranged to resonantly couple light from at least a first core mode of said core region to said first sink in at least a first resonant wavelength range, and said second inner cladding features are arranged to resonantly couple light from at least a second core mode of said core region to said second sink in at least a second wavelength range.

At least one of said first and second core modes may be a higher order mode.

In one embodiment, the first and second transmission pass bands may be substantially overlapping with an overlap in the range of about 90% to about 100% of the bandwidth of said wavelength ranges, such as of about 92% to about 99% of the bandwidth of said wavelength ranges, such as of about 94% to about 98% of the bandwidth of said wavelength ranges.

The first and second transmission pass bands may be shifted relative to'each other with an overlap in the range of about 0% to about 90% of the bandwidth of said wavelength ranges, such as of about 5% to about 80% of the bandwidth of said wavelength ranges, such as of about 5% to about 50% of the bandwidth of said wavelength ranges, such as of about 10% to about 30% of the bandwidth of said wavelength ranges.

The first and second inner cladding features may be arranged so that at wavelengths in a core mode suppression band the transmission loss of an optical signal propagating in said first core mode differs from the transmission loss of an optical signal propagating in said second core mode.

The first and second inner cladding features may be arranged to at wavelengths in a polarization mode suppression band resonantly couple different polarization modes of said core region to said first and second light sink, respectively.

The first, second and third inner cladding features may be in contact with the neighbouring inner cladding feature or they may be spaced apart. In one embodiment, the first inner cladding features are spaced apart. In one embodiment, the second inner cladding features are spaced apart. In one embodiment, the third inner cladding features are spaced apart. In the context of the present invention, the phrase "spaced apart" corresponds to the case where the fiber comprise a region comprising inner cladding basis material in between two neighbouring features. The distance between two spaced apart neighbouring inner cladding features may be such that they are separated by at least one tenth of the dimension of said features.

The inner cladding features arranged to provide a resonant coupling between core modes and the sink(s) may be placed in various arrangements. In one embodiment the first optical resonant structure comprises first inner cladding features arranged substantially along at least a first line that extends from the core region to the first light sink. The first line may extend radially from the centre of said core region. In one embodiment, the second optical resonant structure comprises second inner cladding features arranged substantially along at least a second line that extends from the core region to the second light sink. The second line may extend radially from the centre of said core region.

When the inner cladding features are arranged along a substantially straight line, the inner cladding features can be said to provide a row of rods or a row of elements.

The inventor has realized that the coupling efficiency from modes of the core region to the light sink is enhanced when inner cladding features are placed around a larger part of said core region compared to the case where e.g. only one first inner cladding feature and one second inner cladding is placed in the near vicinity of the core region. This effect may appear for higher order modes.

In one embodiment, the first optical resonant structure comprises first inner cladding features arranged substantially along two intersecting lines tangentially positioned in relation to said core region and optionally along said first line that extends from said core region and intersects said tangentially positioned lines.

In one embodiment, the second optical resonant structure comprises second inner cladding features arranged substantially along two intersecting lines tangentially positioned in relation to said core region and optionally along said second line that extends from said core region and intersects said tangentially positioned lines.

In the context of this application, the phrase "tangentially positioned in relation to said core region" refers to an arrangement of inner cladding features, wherein a "tangentially positioned" line is substantially parallel to a tangent of the core region and the distance from the tangentially positioned line to this tangent is less than the largest cross sectional dimension of the core region, such as about half the largest cross sectional dimension of the core region, such as one quarter of the largest cross sectional dimension of the core region, such as one fifth of the largest cross sectional dimension of the core region, such as one tenth of the largest cross sectional dimension of the core region.

The first optical resonant structure may comprise three or more first inner cladding features arranged along said tangentially positioned line(s). One of these three or more first inner cladding features may be arranged substantially at a point, where said tangentially arranged lines intersect said first line.

The second optical resonant structure may comprise three or more second inner cladding features arranged along said tangentially positioned line(s). One of these three or more second inner cladding features may be arranged substantially at a point, where said tangentially arranged lines intersect said second line.

In one embodiment, the first and second inner cladding features arranged tangentially relative to said core region are substantially identical.

In one embodiment, the first and second lines are collinear, and said second inner cladding features are arranged substantially opposite to said first inner cladding features relative to said core region.

The first and second lines may be parallel but offset, and said second inner cladding features may be arranged substantially opposite to said first inner cladding features relative to said core region.

The inner cladding features may also be arranged such that at least one of the types of inner cladding features is arranged substantially along two lines. In one embodiment, the said first inner cladding features are substantially arranged on two lines on the same side of said inner cladding relative to said core region. The second inner cladding features may be arranged on two lines on the same side of said inner cladding relative to said core region, and substantially opposite to said first inner cladding features relative to said core region.

The inner cladding features may have different shapes. In one embodiment, the first and/or the second inner cladding features are substantially circular shaped in the fiber cross section.

The cross sectional shape of the first inner cladding features and/or the second inner cladding features may be adapted to provide polarization dependent transmission properties. In one embodiment, the optical fiber comprises first inner cladding features having one cross sectional extension along a first major axis and a different cross sectional extension along a first minor axis, such as in a substantially elliptically shaped first inner cladding feature. In one embodiment, the optical fiber comprises second inner cladding features having one cross sectional extension along a second major axis and a different cross sectional extension along a second minor axis, such as in a substantially elliptically shaped first inner cladding feature. The polarization dependence of the transmission loss of light propagating in the core region of a fiber comprising such non-circular shaped inner cladding features may be determined from the shape of the first and/or second inner cladding features. In one embodiment, said first major axis is substantially perpendicular to said second major axis.

The optical fiber according to the present invention may be a microstructured optical fiber. Microstructured optical fibers may be produced by the stack-and-draw method where tubes and rods are stacked and drawn either directly to a fiber or first to a fiber preform and then to a fiber. In one embodiment the optical fiber is a microstructured optical fiber with at least a part of said first, second, third, and fourth inner cladding features arranged in a substantially hexagonal lattice.

When the optical fiber according to the present invention is a microstructured optical fiber with the inner cladding features arranged in a substantially hexagonal lattice, the core region may have the highest degree of symmetry when it comprises for instance a 1, 7 or 19 cell core region. Core regions with a lower degree of symmetry may also be realized. The core region may comprise a 1, 3, 4, 7 or 19 cell core, or a core with more than 19 cells.

When the optical fiber according to the present invention is a microstructured optical fiber with the inner cladding features arranged in a square lattice, the core region have the highest degree of symmetry when it comprises for instance a 1, 4, 9 or 16 cell core. The fiber core region may comprise a 1, 4, 9 or 16 cell core, or a core region with more than 16 cells.

In a microstructured optical fiber with a substantially hexagonal arrangement of the inner cladding features, the first and second inner cladding features may be arranged substantially along lines tangentially positioned in relation to said core region by arranging them in at least a part of the first ring surrounding said core region. The first ring may also be referred to as the first inner ring. The substantially hexagonal arrangement of the inner cladding features is defined by a hexagonal lattice in which some lattice locations are comprised in the core region and others in the inner cladding. The first ring surrounding the core region is then the lattice locations which have a distance to a core lattice position equal to the pitch of the lattice. The pitch of the hexagonal lattice is the distance between two neighbouring locations in the lattice.

The core region and the cladding region may comprise the same basis material. In one embodiment, the core region comprises inner cladding basis material. Confinement of the optical signal to the core region can be realized using different schemes such as index guidance and the PBG effect as described above. In one embodiment, the core region comprises at least a first core feature having a refractive index different from the refractive index of said inner cladding material. In one embodiment, the core region comprises silica material doped with at least one index raising dopant, such as Germanium (Ge) or Phosphorous (P). The core region may then be surrounded by an inner cladding wherein the inner cladding basis material comprises silica with a lower Germanium and/or Phosphorous concentration, such as substantially Germanium-free or Phosphorous-free silica glass with a refractive index below that if the core region. In such a configuration, the fiber may guide an optical signal by the index guidance scheme. The silica material doped with at least one index raising dopant may be comprised in a core region feature.

Silica based optical fibers are often used as active elements, such as fiber amplifiers or fiber lasers. In order to be active and capable of amplifying an optical signal, the fiber must comprise an active element. In one embodiment, the optical fiber according to the present invention comprises an active region comprising at least one active element, such as a Rare Earth element.

The action region may be distributed over the fiber cross section in various ways. The active region may at least partly be comprised within said core region and/or within said inner cladding region. In one embodiment, the active region comprises an annular shaped region. The annular shaped region may comprise a coherent ring surrounding the centre of said core region.

For some applications photo-darkening in an active fiber is a problem. It has been realized by Kent Mattsson that the extent to which photo-darkening occurs with time can be mitigated by reducing the overlap of the guided optical signal and the active region. This is described in provisional U.S. application 61/162,483.

The reduced modal overlap may be realized in various ways. In one embodiment, the concentration of the active element at a second radial distance, $r_2$, from the centre of said core region is higher than the concentration of the active element at a first radial distance, $r_1$, from the centre of the core region, wherein $r_1 < r_2$. In one embodiment, the concentration of said active element has a local minimum in the centre of said core region. The concentration of said active element may be substantially zero in the centre of said core region.

In one embodiment, the annular region comprises a plurality of active features arranged in a ring surrounding the centre of said core region. The active features of said ring may comprise fifth inner cladding features comprising said active element. The active element(s) of the annular region may be located in the core region. In one embodiment, the active features of said annular region comprise active core features comprising said active element.

A reduced modal overlap with the active region may also be realized for the optical signal guided in the core region by arranging active core features in a cross sectional confined part of said core region. The active region may comprise at least one active core feature. In one embodiment the fiber comprises at least one active core feature which is arranged substantially along a first core line. The first core line may be parallel to said first line.

The refractive index of the active features may be influenced by the presence of the active element(s). By adding one or more additional dopants, the refractive index may be adjusted. In one embodiment the active features have a refractive index profile below or substantially equal to the refractive index of said inner cladding basis material.

In one embodiment the fundamental core mode has a reduced modal overlap with the active element, such as a modal overlap which is below 25%, such as below 20%, such as below 15%, such as below 10%, such as below 5%, such as below 1%. The active region may also be arranged so that the at least one higher order mode has a reduced modal overlap with the active element. In one embodiment the higher order mode(s) has a modal overlap with the active element which is below 25%, such as below 20%, such as below 15%, such as below 10%, such as below 5%, such as below 1%. In one embodiment the guided optical signal may comprises light propagating in a plurality of modes, and the guided optical signal has a modal overlap with the active element which is below 25%, such as below 20%, such as below 15%, such as below 10%, such as below 5%, such as below 1%.

In one embodiment the active element is an Rare Earth element selected from the group of Ytterbium (Yb), Erbium (Er), Praseodymium (Pr), Neodynium (Nd), Holmium (Ho), Thulium (Tm), Dysprosium (Dy), or combinations thereof. An active element has at least one range of wavelengths in its emission spectrum, wherein a relatively strong emission is observed when the active element is pumped by a pump signal. In one embodiment, the plurality of inner cladding features provides a resonant coupling of one or more higher-order modes (HOM) at a wavelength where the emission spectrum of said active element show a relatively strong signal.

The refractive index profile of the core region may be uniform or have a variation in the fiber cross section. In one embodiment the core region comprises a refractive index profile, wherein the refractive index at a second radial distance, $r_{2c}$, from the centre of said core region is higher than the refractive index at a first radial distance, $r_{1c}$, from the centre of the core region, wherein $r_{1c} < r_{2c}$. In one embodiment the core region comprises a refractive index profile, wherein the refractive index at a second radial distance, $r_{2c}$, from the centre of said core region is lower than the refractive index at a first radial distance, $r_{1c}$, from the centre of the core region, wherein $r_{1c} < r_{2c}$.

The arrangement of inner cladding features may make the optical fiber according to the present invention birefringent. This birefringence may be enhanced or lowered, or a birefringence may be introduced, by adding stress applying elements to the fiber. In one embodiment, the optical fiber further comprises stress applying elements arranged to apply stress to said core region and/or said inner cladding features. These said stress applying elements may comprise Boron (B) and/or Fluorine (F) doped silica. The stress applying elements may also be referred to as stress applying inner cladding features.

The outer cladding of the optical fiber may comprise regions for providing mechanical stability and/or for adjusting the optical properties, or for adding new optical properties, to the optical fiber. In one embodiment, the first outer cladding region is surrounded by a second outer cladding. The second outer cladding may comprise an air cladding and/or a low-index polymer coating and/or a high-index polymer coating. The air cladding may be realized by introducing a ring of closely spaced outer cladding features having an effective refractive index below that of the first outer cladding. The outer cladding features may comprise voids and/or down-doped silica material. The minimum distance between two neighbouring outer cladding features may be in the order of 1 micrometer or less, such as 0.6 micrometer or less. An air cladding and a low-index polymer coating may ensure that the part of the optical fiber that is surrounded by the second outer cladding has a high Numerical Aperture (NA). A second outer cladding comprising a high-index polymer coating may serve as a light sink for e.g. pump light that is not propagating in the active region.

The outer dimension of said fiber is in the range of about 80 micron to about 5000 micron, such as in the range of about 100 micron to about 2000 micron, such as in the range of about 125 micron to about 500 micron, such as in the range of about 150 micron to about 300 micron. At large outer diameters, a Silica fiber becomes highly rigid. In this case, the fiber is often referred to as a rod. The outer dimension of the fiber may be kept constant along the axial direction of the fiber, or it may be varied. In one embodiment, the optical fiber is tapered from a first diameter to a second diameter over a tapering length. The tapering may result in a linear or exponential decrease of the outer diameter of said optical fiber.

The cross sectional dimension of the inner cladding features are so that the diameter of circular shaped inner cladding features is in the range of about 0.2 µm to about 400 µm, such as in the range of about 0.5 µm to about 250 µm, in the range of about 1 µm to about 100 µm; in the range of about 1.5 µm to about 50 µm, in the range of about 2 µm to about 35 µm, in the range of about 4 µm to about 20 µm, in the range of about 5 µm to about 15 µm.

The cross sectional dimension of the inner cladding features are so that the length of the major axis of elliptical shaped inner cladding features is in the range of about 0.2 µm to about 400 µm, such as in the range of about 0.5 µm to about 250 µm, in the range of about 1 µm to about 100 µm; in the range of about 1.5 µm to about 50 µm, in the range of about 2 µm to about 35 µm, in the range of about 4 µm to about 20 µm, in the range of about 5 µm to about 15 µm.

The cross sectional dimension of the inner cladding features are so that the ratio between the length of the major axis and the minor axis of elliptical shaped inner cladding features is in the range of about 0.1 to about 0.99, such as in the range of about 0.2 to about 9, as in the range of about 0.3 to about 0.8, in the range of about 0.4 to about 0.7.

In one embodiment, the inner cladding features are arranged to capture and resonantly couple higher order modes of the core region to modes in said first outer cladding.

In one embodiment, the optical fiber according to any of the previous claims, further comprising inner cladding features arranged to form at least a third optical resonant structure. The first, second and third optical resonant structures may comprise inner cladding features arranged substantially along said first line, said second line, and a third line extending from said core region to a sink, said lines being arranged with substantially equal angles between them, i.e. 120 degrees between two neighboring lines.

In one embodiment, the optical fiber comprises inner cladding features to form a first, a second, a third and a fourth optical resonant structure, wherein said inner cladding features are arranged substantially along said first line, said second line, a third line extending from said core region to a sink, and a fourth line extending from said core region to a sink. In one embodiment, the four lines are arranged with substantially equal angles between them, i.e. 90 degrees between two neighboring lines.

The different optical resonant structures may each hold substantially identical inner cladding features. In one embodiment the first inner cladding features are arranged along the first line, the second inner cladding features are arranged along the second line, and so forth. One type of inner cladding feature may be comprised within two or more optical resonant structures. In one embodiment, two or more optical resonant structures hold substantially identical inner cladding features.

One object of the invention is to provide an optical fiber comprising an axial direction and a cross section perpendicular to said axial direction. The optical fiber comprises a light guiding fiber portion comprising a cladding region with a plurality of spaced apart cladding features defined in a fiber basis material, said features extending longitudinally in the fiber axial direction and a core region surrounded by said cladding region. At least one of said cladding features comprises a high-index material and wherein at least one of said cladding features comprises a void.

The optical fiber may comprise a plurality of cladding features comprising high-index material. At least part of the plurality of cladding features comprising high-index material may be arranged along at least one substantially straight line extending through at least a part of the cladding region. The said substantially straight line may intersect the fiber core region.

The phrase high-index material specifies the situation wherein the material of the cladding features have a refractive index which is above that of the fiber basis material, or in other words when the inner cladding features comprise a material with a refractive index profile above that of the inner cladding basis material.

In one embodiment, the high-index material comprises at least one refractive index modifying dopant. In one embodiment, the optical fiber comprises high-index material cladding features of different sizes and/or shapes. The light guiding fiber portion may comprise silica material.

Optical fibers, such at those according to the present invention, may be combined in a manner where light propagating in a first length of fiber is coupled into a second length of fiber. In one embodiment, the optical fiber comprises a first length of a first optical fiber according to the invention and a second length of a second optical fiber according to invention. The first and second optical fibers may both comprise first and second optical resonant structures, and the first optical resonant structure of the first optical fiber may optionally be arranged at an angle to the first optical resonant structure of the second optical fiber, such as an angle of about 15 degrees, such as at an angle of about 30 degrees, such as at an angle of about 45 degrees, such as at an angle of about 60 degrees, such as at an angle of about 75 degrees, such as at an angle of about 90 degrees.

In one embodiment, the first optical fiber comprises first and second optical resonant structures, and the second fiber comprise third and fourth optical resonant structures. The first optical resonant structure of said first optical fiber and the third optical resonant structure of said second optical fiber may optionally be arranged at an angle to each other, such as at an angle of about 15 degrees, such as at an angle of about 30 degrees, such as at an angle of about 45 degrees, such as at an angle of about 60 degrees, such as at an angle of about 75 degrees, such as at an angle of about 90 degrees Different techniques may be applied to arrange and maintain the first and second lengths of optical fiber relative to each other so that light is coupled from the first to the second fiber length. In one embodiment, the first and second lengths of the optical fiber are spliced together.

The inner cladding features in an optical resonant structure may be arranged in a substantially constant pitch throughout the structure. In the context of the present invention, the phrase substantially constant pitch refers to the situation wherein variations in the center-to-center distance between neighboring features is below 20%, such as below 15%, such as below 10%, such as below 8%, such as below 5%, such as below 2%, such as below 1%. The substantially constant pitch may be in the range of about 1 µm to about 50 µm, such as in the range of about 2 µm to about 30 µm, such as in the range of about 3 µm to about 20 µm, such as in the range of about 4 µm to about 10 µm, such as in the range of about 5 µm to about 8 µm.

The following description refers to the first inner cladding features, but the same comments apply to the second inner cladding features or any other inner cladding features taking part in an optical resonant structure in the fiber according to the present invention.

This arrangement of inner cladding features may be such that the first inner cladding features are arranged substantially equidistantly in a single row, or arranged equidistantly in two or more rows, such as three or four rows, or in an arrangement with an increasing number of inner cladding features when going from said core region to said outer cladding, such as a triangular arrangement comprising one corner located at the core region and the two other corners arranged at the first outer cladding region. All first inner cladding features do not necessarily need to be arranged substantially equidistantly. The first inner cladding features may also be arranged in two or more rows, wherein in each row, the features are arranged substantially equidistantly, but where the two or more rows are cross sectional displaced relative to each other so that the distance between a feature in a first row and the nearest inner cladding feature in a neighbouring row is larger or smaller than its distance to the nearest neighbour in said first row.

The inner cladding features in a one optical resonant structure may either be in contact with or in close proximity to the neighbouring inner cladding feature(s), such as within a distance corresponding to the cross sectional dimension of said inner cladding features, such as about half of this distance, such as about one fourth of this distance, such as about fifth of this distance, such as about tenth of this distance.

In one embodiment, the inner cladding region comprises at least one region, wherein no first or second inner cladding features are present, said at least one region having at least one section with a cross sectional dimension which is at least twice the distance between two neighboring inner cladding features, such as three times the distance between two neighboring inner cladding features, such as four times the distance between two neighboring inner cladding features, such as five times the distance between two neighboring inner cladding features, such as six times the distance between two neighboring inner cladding features, such as eight times the distance between two neighboring inner cladding features, such as ten times the distance between two neighboring inner cladding features, such as more than ten times the distance between two neighboring inner cladding features.

The optical fiber may comprise a mix of inner cladding feature sizes and shapes in each optical resonant structure. In one embodiment, inner first and/or second inner cladding features arranged substantially along a line comprises alternating circular and elliptical inner cladding features.

The optical fiber may comprise a stress element in one side, which favours bending inwards or outwards of the bend plane. The element can be located outside the inner cladding region, such as outside the first outer cladding region.

One object of the present invention is to provide an optical fiber system comprising the optical fiber according to the present invention, where said optical fiber is arranged in a coiled up arrangement over at least a part of its length. The fiber is arranged in a casing comprising at least one holding unit adapted to hold and maintain said optical fiber in said coiled up arrangement at least for a period of time. Light is coupled to and from the optical fiber through a coupling unit adapted to couple light into and/or out of said optical fiber.

Due to the optical resonant structure(s), the fiber has reduced rotation symmetry (as compared to a completely centro-symmetric fiber). When the optical fiber is bent, the change in its optical properties depends on the direction of the bend relative to the optical resonant structure(s). That is, when the optical fiber is bent in one direction relative to its optical resonant structure(s), the change in the optical properties may differ from when it is bent in another direction relative to the optical resonant structure(s). Two of the optical properties that may be affected by bending the optical fiber are the width of the transmission pass band and the polarization properties of the fiber.

In one embodiment, the coiled up arrangement of the optical fiber is such that the coil has a center and said first optical resonant structure is oriented substantially towards the centre of the coil. The optical fiber may further comprise said second optical resonant structure, which is oriented substantially away from the centre of said coil.

The coiled fiber may be arranged so that the first transmission pass band and the second transmission band are spectrally positioned such that the bend induced loss at the edges of said effective transmission pass band is reduced or increased compared to when the fiber is substantially straight.

In one embodiment the optical fiber of the optical fiber system is arranged such that the first optical resonant structure oriented substantially towards the center of the coil comprises first inner cladding features having a normalized frequency parameter and/or an effective refractive index that is higher than that of said second inner cladding features of said second optical resonant structure directed substantially away from the center of the coil. With this arrangement of said first and second optical resonant structures, the change in the effective transmission pass band caused by the bending of the fiber may be relatively small. In one embodiment, the shift in the high wavelength and the low wavelength edges of the effective transmission pass band are both below about 20 nm, such as below about 10 nm, such as below about 5 nm, such as below about 2 nm, such as below about 1 nm, such as below about 0.5 nm, such as below about 0.2 nm, such as below about 0.1 nm. The spectral range covered by the effective transmission pass band may hence be almost the same as that of the optical fiber when this is straight.

In one embodiment the optical fiber of the optical fiber system is arranged such that the first optical resonant structure oriented substantially towards the center of the coil comprises first inner cladding features having a normalized frequency parameter and/or an effective refractive index that is lower than that of said second inner cladding features of said second optical resonant structure directed substantially away from the center of the coil. With this arrangement of said first and second optical resonant structures, the change in the effective transmission pass band caused by the bending of the fiber may be relatively large. In one embodiment, the shift in the high wavelength and the low wavelength edges of the effective transmission pass band are both above about 0.5 nm, such as above about 1 nm, such as above about 2 nm, such as above about 5 nm, such as above about 10 nm, such as above about 20 nm, such as above about 30 nm. This spectral range covered by the effective transmission pass band may hence be reduced significantly compared to the effective transmission pass band of the optical fiber when it is straight.

In one embodiment, the optical fiber system comprises said optical fiber in a coiled up arrangement wherein the coil has a center, and wherein said first optical resonant structure is oriented substantially along the normal of the circle defined by the coil. The optical fiber may comprise said second optical resonant structure which may be oriented substantially along the normal of the circumference defined by the coil and on the opposite side of said core region relative to said first optical resonant structure.

In one embodiment the optical fiber system further comprises a light source arranged to launch pump light into said optical fiber. The light source may be selected from the group of a laser, a high power laser, a diode laser, a LED, a light bulb, a supercontinuum source or a white light source.

BRIEF DESCRIPTION OF DRAWINGS

The invention will be explained more fully below in connection with a preferred embodiment and with reference to the drawings in which.

Figure 1:
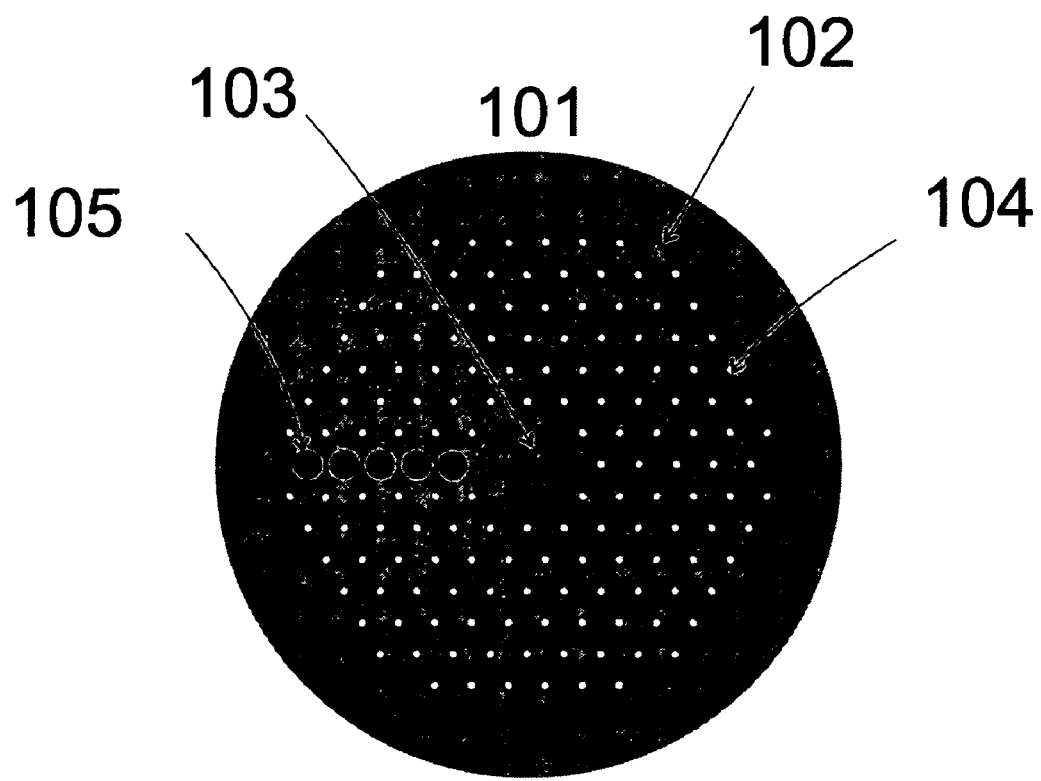
FIG. 1 shows a fiber design comprising a microstructured inner cladding region comprising a first optical resonant structure with up-doped first inner cladding features arranged along a first line, and third inner cladding features (voids) arranged in a hexagonal lattice.

Within the descriptions of the figures, similar elements are provided similar names and reference numerals as those of the previous figure(s). Where a later figure utilizes an element that has been introduced previously, the element is provided a different leading numeral representative of the figure number (e.g. 1xx for FIG. 1 and 2xx for FIG. 2). The specific numerals assigned to the elements are provided solely to aid in the description and not meant to imply any limitations (structural or functional) on the invention.

The figures are schematic and may be simplified for clarity. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

The optical resonant structure(s) of the fiber according to the present invention may differ in number, overall shape and in relative arrangement. The examples below describe some of the fiber designs that are within the scope of the invention.

EXAMPLE 1

Figure 2:
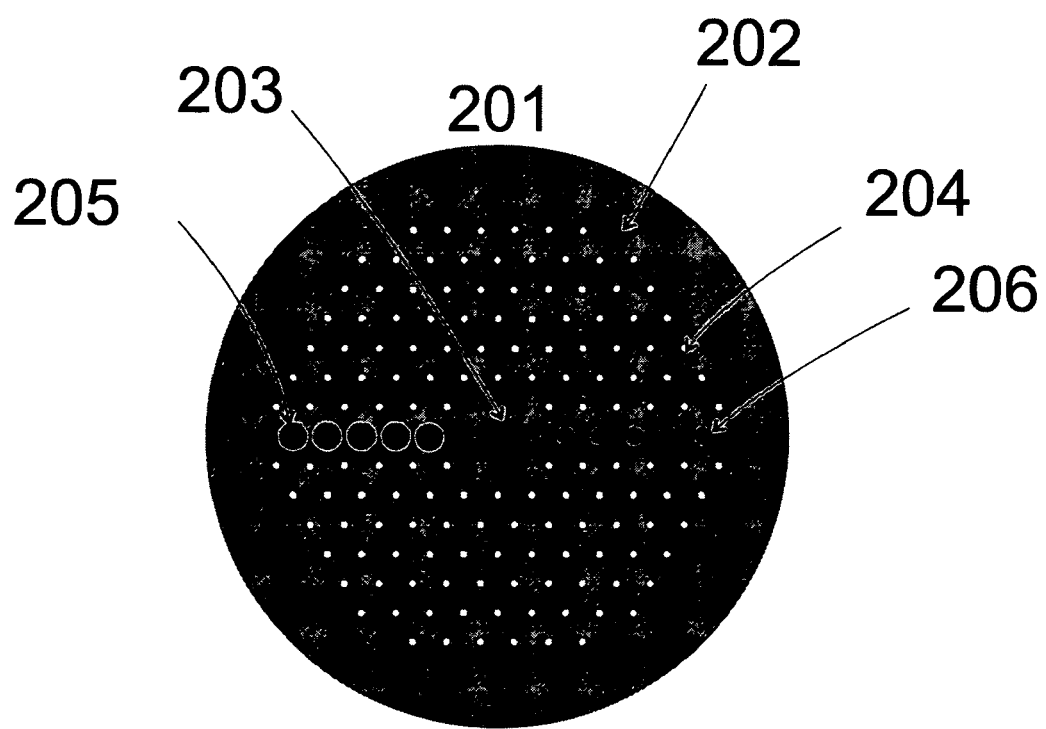
FIG. 2 shows a fiber design comprising a microstructured inner cladding region comprising a first and a second optical resonant structure with up-doped first and second inner cladding features having slightly different diameters, and third inner cladding features (voids) arranged in a hexagonal lattice.

An optical fiber 101 design with an asymmetric response to bending of the fiber can be realized by providing a single resonant structure that connects the core region 103 and an outer cladding region 102. In the hexagonal fiber design illustrated in FIG. 1, the core region 103 is defined by a plurality of third inner cladding features 104 surrounding a 7-cell core comprising un-doped inner cladding basis material. The optical resonant structure is defined by five circular high-index first inner cladding features 105 arranged along a line. The fiber can be a silica based fiber with the refractive index of the first inner cladding features 105 raised above that of the inner cladding basis material by doping with for instance Germanium or Phosphorous. The third inner cladding features 104 are voids with a diameter to pitch ratio so that the fiber can have a large mode areas while still guiding an optical signal in single-mode operation. The numerical aperture of the 7 cell core fiber according to FIG. 1 is N.A.<0.06.

EXAMPLE 2

Figure 3:
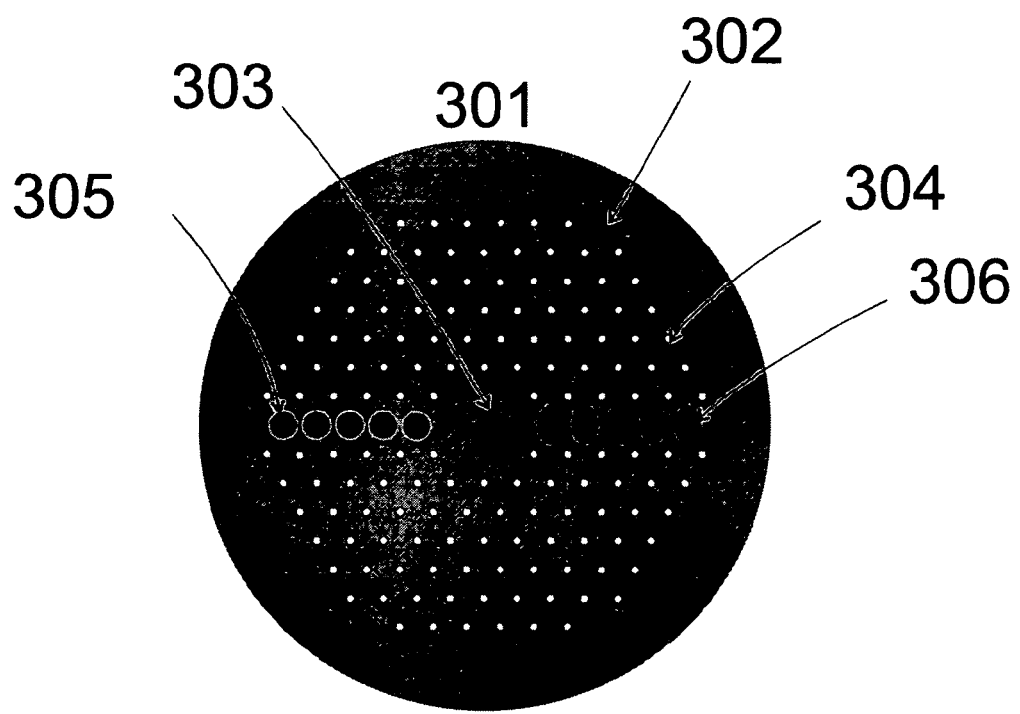
FIG. 3 shows a fiber design comprising a microstructured inner cladding region comprising a first and a second optical resonant structure with up-doped first and second inner cladding features having different cross sectional shape, and third inner cladding features (voids) arranged in a hexagonal lattice.
Figure 4:
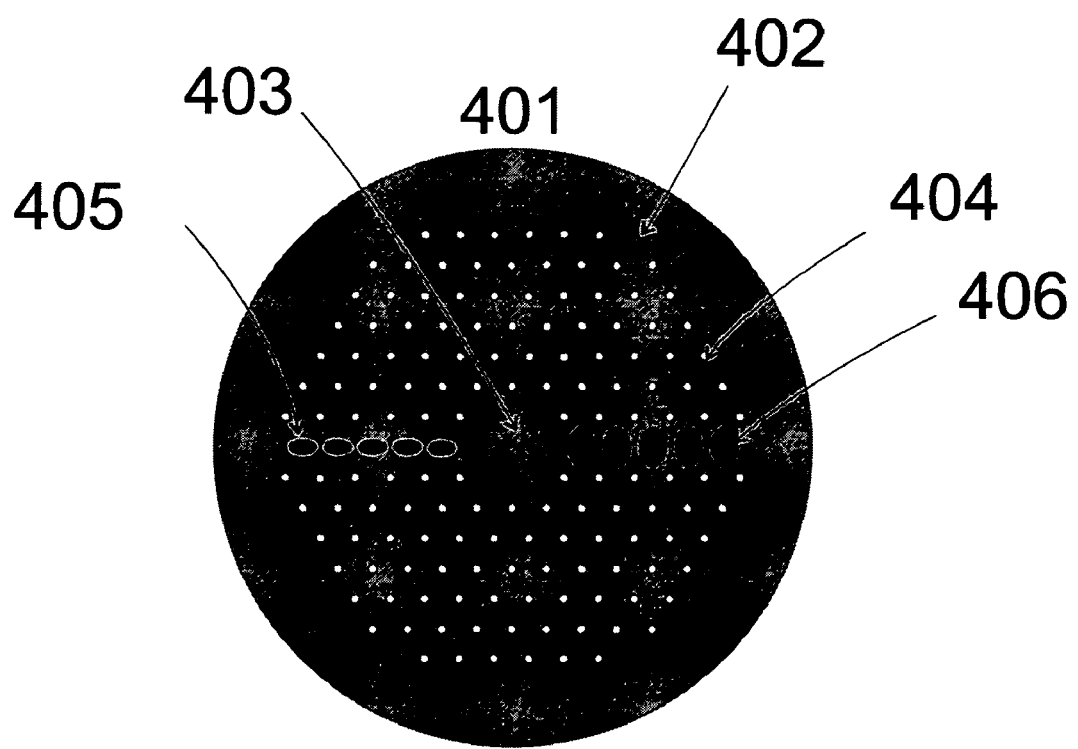
FIG. 4 shows a fiber design comprising a microstructured inner cladding region comprising a first and a second optical resonant structure with up-doped first and second inner cladding features having different dimensions, and third inner cladding features (voids) arranged in a hexagonal lattice.

With reference to FIGS. 2, 3, 4, and 7, is described fiber designs of a Large Mode Area optical fiber 201, 301, 401, 701 that guide light in a narrow spectral transmission window. The optical fiber has a first and a second optical resonant structure that connects the core region 203, 303, 403, 703 and a sink 202, 302, 402, 702. The spectral width of the transmission window can be engineered by proper scaling of the diameter of the inner cladding features. In the hexagonal fiber design illustrated in FIGS. 2-4 and 7, the core region 203, 303, 403, 703 is defined by a plurality of third inner cladding features 204, 304, 404, 704 surrounding a 7-cell core comprising un-doped inner cladding basis material, which is taken to be a silica material, but in principle can be any material suitable for producing waveguides, such as substantially transparent polymer materials. The optical resonant structures are both defined by five up-doped high-index inner cladding features 205, 206, 305, 306, 405, 406, 705, 706 with first inner cladding features 205, 305, 405, 705 arranged along a first line, and second inner cladding features 206, 306, 406, 706 arranged along a second line. The lines are collinear and intersect the centre of the core region. The third inner cladding features 204, 304, 404, 704 are voids with a diameter to pitch ratio sufficiently low so that the fiber core can have a large mode area while still guiding an optical signal in single-mode operation. The first and second inner cladding features can differ both in cross sectional shape and in refractive index profile. In the fiber designs illustrated in FIGS. 2 and 7, both the first inner cladding feature 205, 705 and the second inner cladding feature 206, 706 are circular, with the diameter of the first inner cladding being larger than the outer diameter of the second inner cladding feature 206, 706. In FIG. 3, the second inner cladding feature 306 is elliptical shaped, while both the first 405 and the second 406 inner cladding features are elliptical shaped with the major axis of the first inner cladding features 405 being perpendicular to the major axis of the second inner cladding features 406. Thereby the polarizing properties of the fiber may be enhanced. The spectral window can be tailored by proper scaling of the diameter of the inner cladding features. An extra feature 708 can be placed outside the inner cladding region to indicate the orientation of the optical resonant structures of the optical fiber. The extra feature 708 can be a stress applying part such as a boron-doped region in a silica fiber, which defines a preferential bend plane of the fiber.

Figure 40:
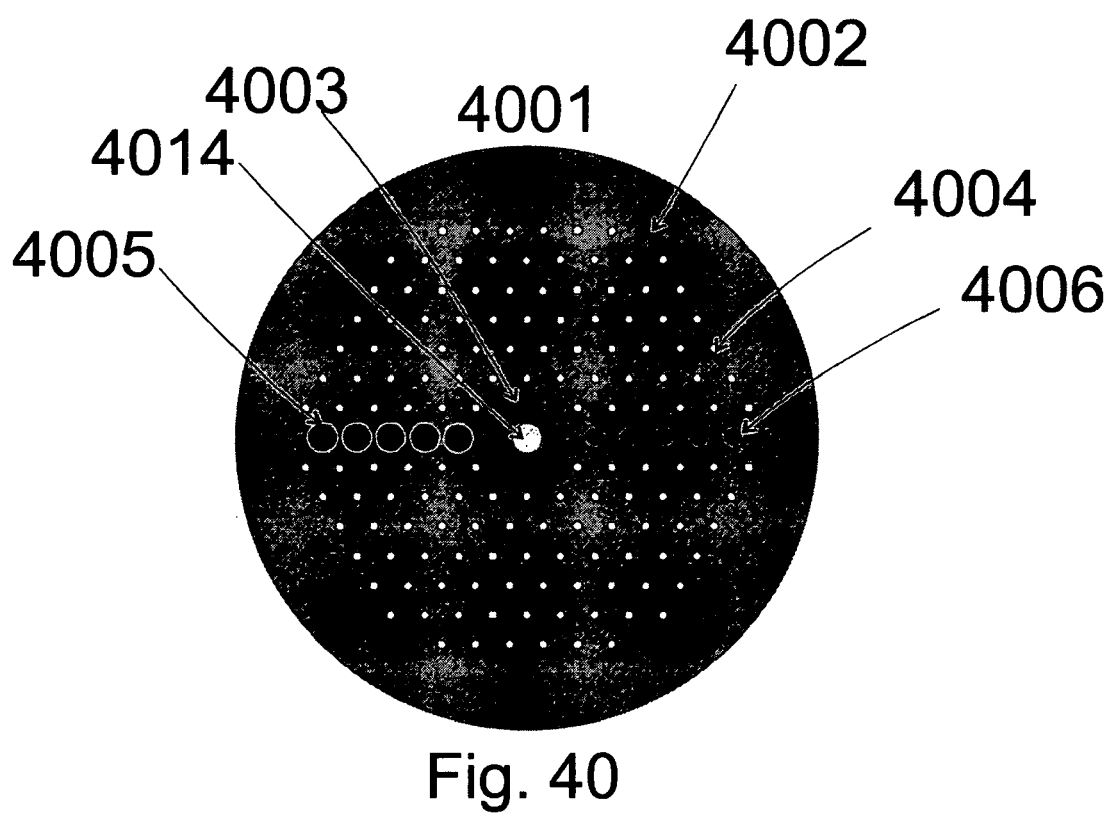
FIG. 40 shows a fiber design with a microstructured inner cladding region comprising a first and a second optical resonant structure with up-doped inner cladding features having slightly different diameters, third inner cladding features (voids) arranged in a hexagonal lattice, and an up-doped core feature in the core region.

With reference to FIG. 40 is described an optical fiber with improved Single Mode (SM) and bend performance. The optical fiber has a first and a second optical resonant structure that connects the core region 4003 to a sink 4002. The spectral width of the transmission window can be engineered by proper scaling of the diameter of the first inner cladding features 4005 and the second inner cladding features 4006. The optical fiber 4001 has a hexagonal lattice of third inner cladding features 4004 surrounding the core region 4003. The central part of this core region 4003 has a region 4014 with a slightly higher refractive index compared to the remaining core region. The refractive index of the central part can be raised in a silica based fiber by doping with Germanium or Phosphorous.

Figure 23:
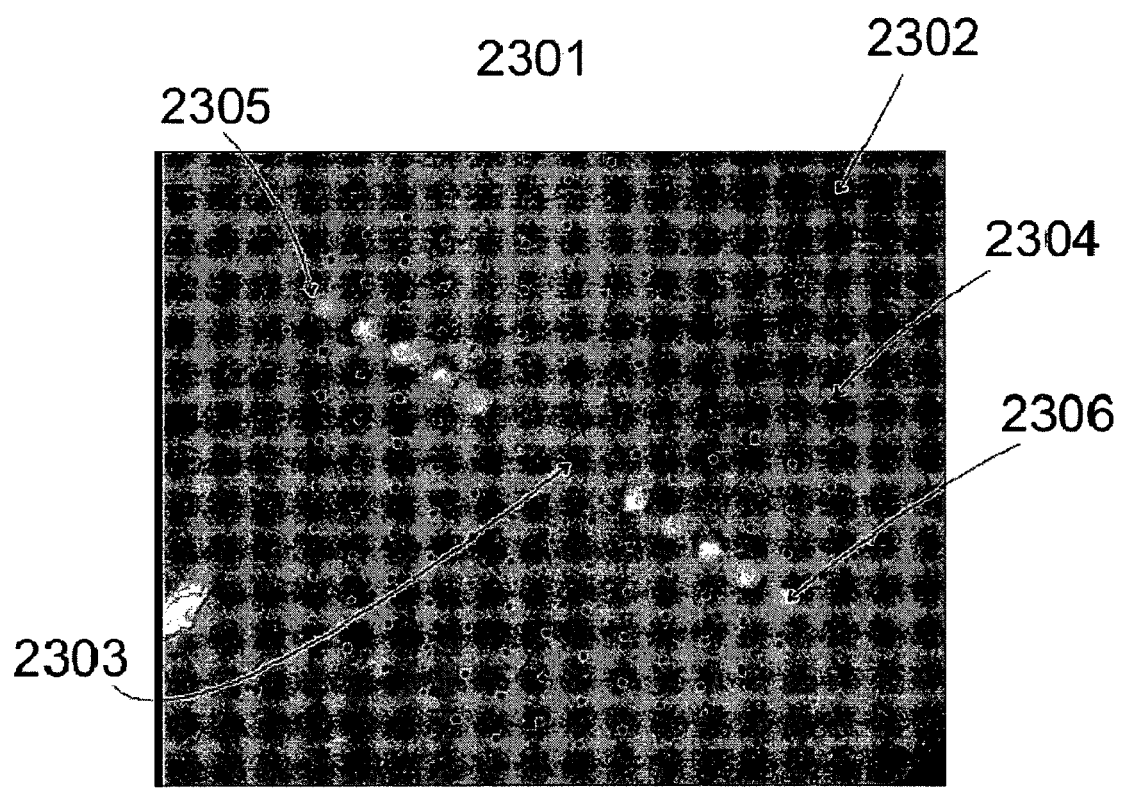
FIG. 23 shows a picture of manufactured fiber according to the present invention.
Figure 34:
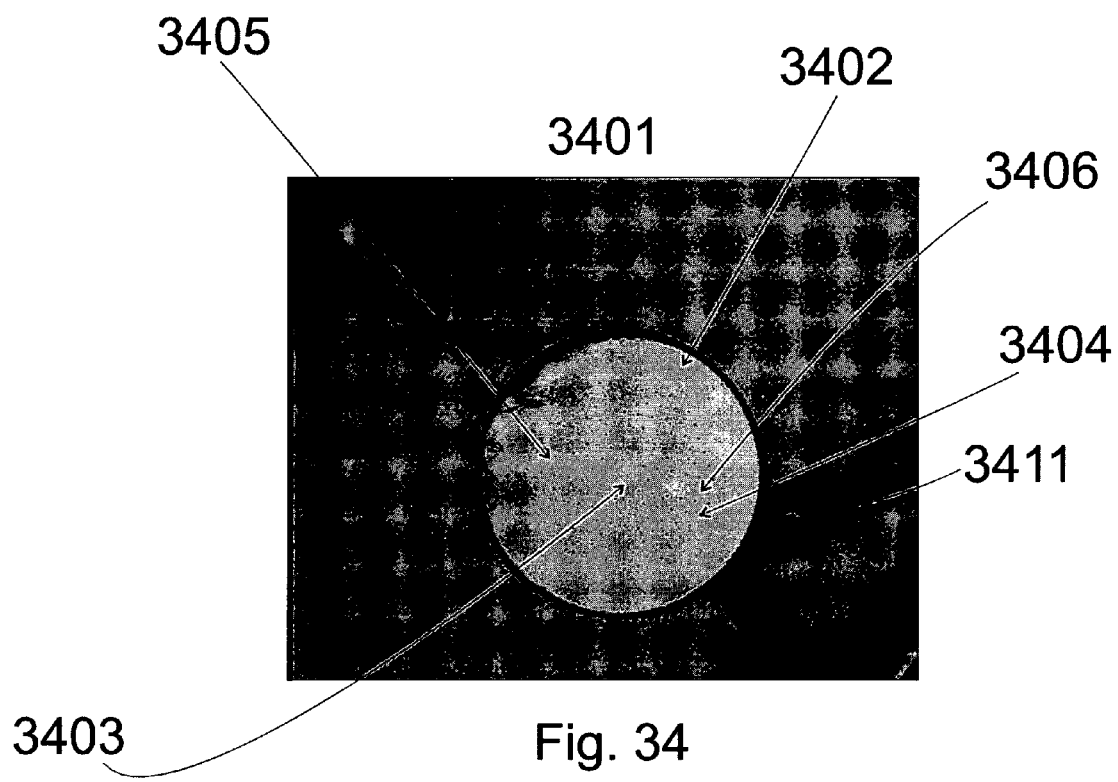
FIG. 34 shows a picture of manufactured a fiber according to the invention.

Realizations of fibers according to the present invention are seen in the photographs of FIGS. 23 and 34. The fibers 2301, 3401 comprise a core region 2303, 3403 which is surrounded by a plurality of voids 2304, 3404 (the third inner cladding features of the fiber) arranged in a hexagonal lattice. First inner cladding features 2305, 3405 and second inner cladding features 2306, 3406 are arranged along co-linear lines connecting the core region 2303, 3403 and the light sink 2302, 3402. In FIG. 34, an air cladding 3411 is also seen. In the realizations depicted in FIGS. 23 and 34, the pitch of the hexagonal lattice is 9.7 µm, the void diameter to pitch ratio is about 0.15-0.15, and the outer diameter is about 455 µm. The core region is distributed over 7 lattice positions in the hexagonal lattice giving a Mode Field Diameter of approximately 27 µm.

Figure 30:
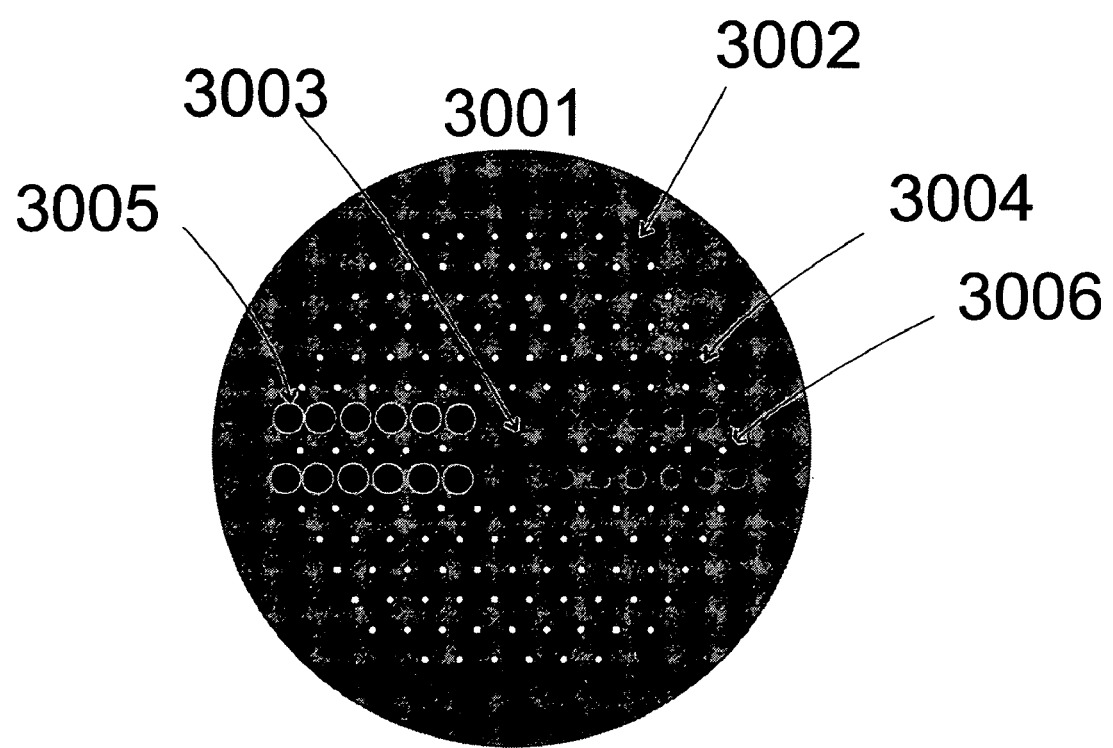
FIG. 30 shows a fiber design comprising a microstructured inner cladding region comprising a first and a second optical resonant structure comprising up-doped first and second inner cladding features having different cross sectional shapes and third inner cladding features (voids), said first and second inner cladding features being arranged along parallel lines on both sides of the fiber core region.

The optical resonant structures of the fiber may take different forms. Many of the examples presented herein have optical resonant structures with inner cladding features arranged along a single line. However, many other arrangements are possible and the scope of this invention is accordingly broader. With reference to FIG. 30 is described one realization, where the optical fiber 3001 has the first inner cladding features 3005 arranged in two rows that connects the core region 3003 to the sink 3002. In each row, the features are arranged substantially equidistantly. The two rows are however cross sectional displaced relative to each other so that the distance between a feature in a first row and the nearest inner cladding feature in a neighboring row is larger or smaller than its distance to the nearest neighbor in said first row. In the design of FIG. 30, third inner cladding features 3004 area arranged in between the rows of an optical resonant structure as well as around the core region 3003.

The optical fiber designs illustrated on these figures may all be realized as optical fibers or optical fiber rods. The optical fiber design seen in FIG. 30 may be realized as a fiber rod. In one realization, the pitch of the hexagonal lattice is about 11 um, the inner clad diameter about 200 um, and the core size corresponds to 19 cells. The central part of core can be up-doped or down-doped. The NA of the inner cladding features relative to the inner cladding basis material is in the order of 0.29, and the diameter of the first inner cladding features is 7 µm, and the diameter of the second inner features about 6 µm to 7 µm. The diameter of the voids is about 1 µm to 2 µm.

Figure 35:
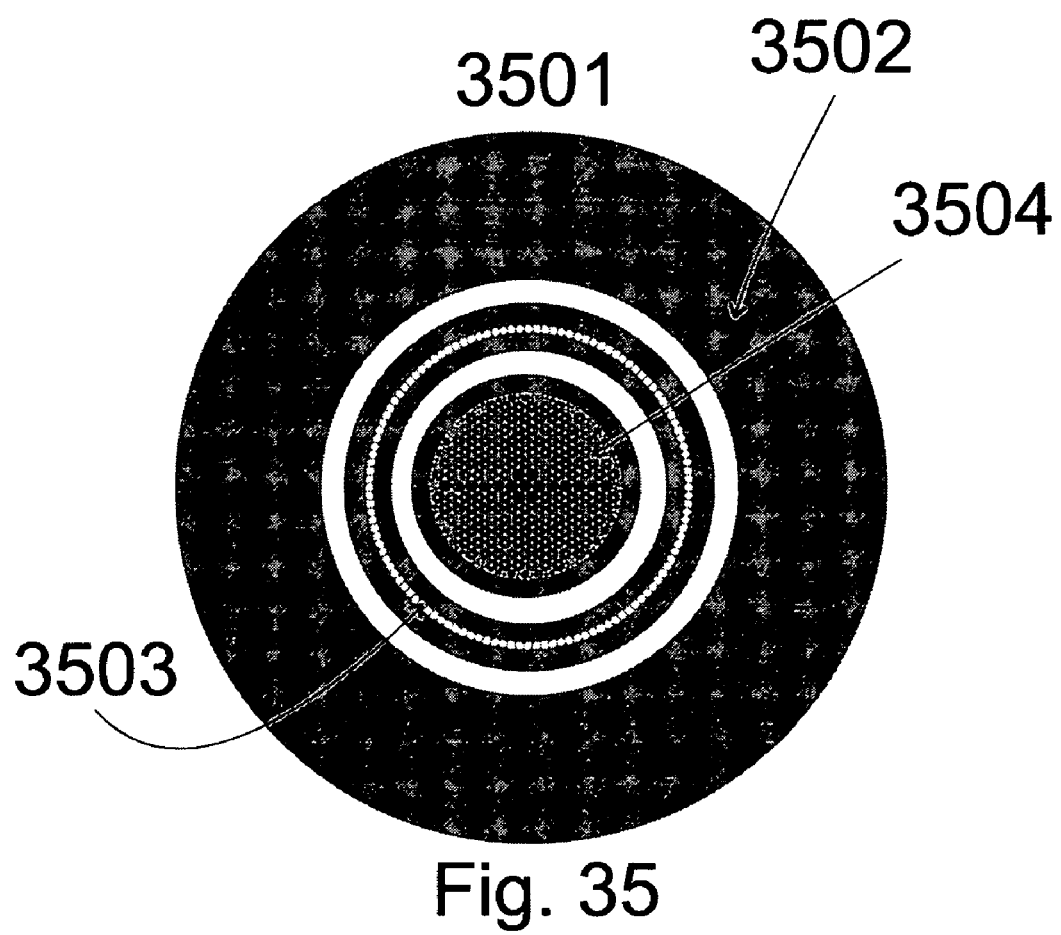
FIG. 35 shows a schematic illustration of a preform for producing an optical fiber according to the invention
Figure 36:
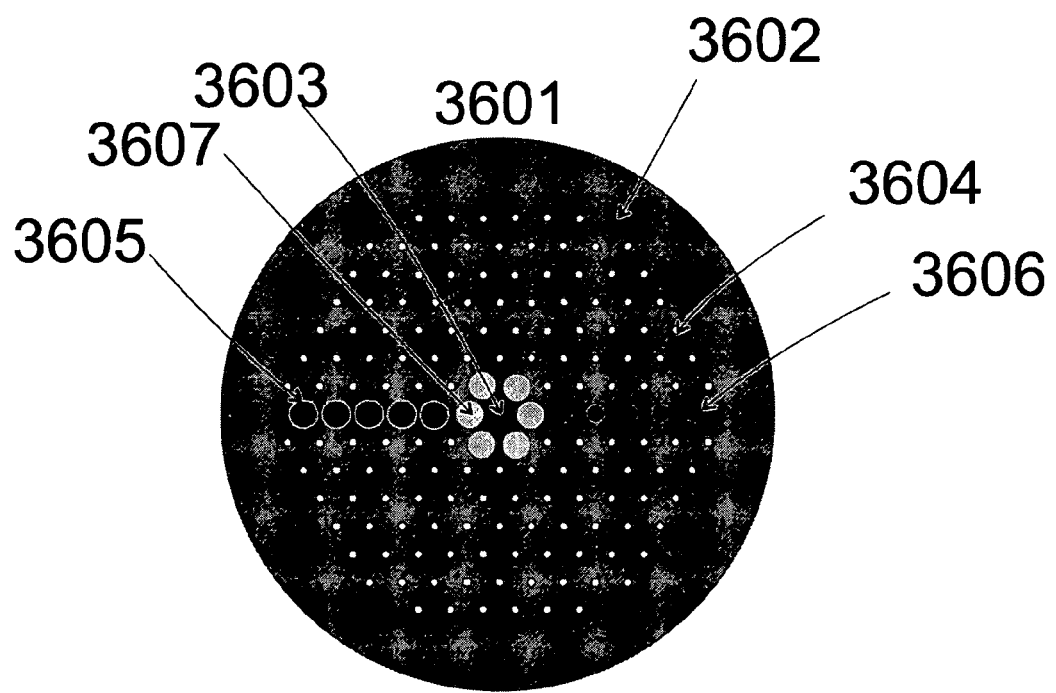
FIG. 36 shows a fiber design comprising a microstructured inner cladding region comprising a first and a second optical resonant structures with first and second up-doped inner cladding features arranged along a first and a second line, third inner cladding features (voids), and an active region comprising active features.
Figure 37:
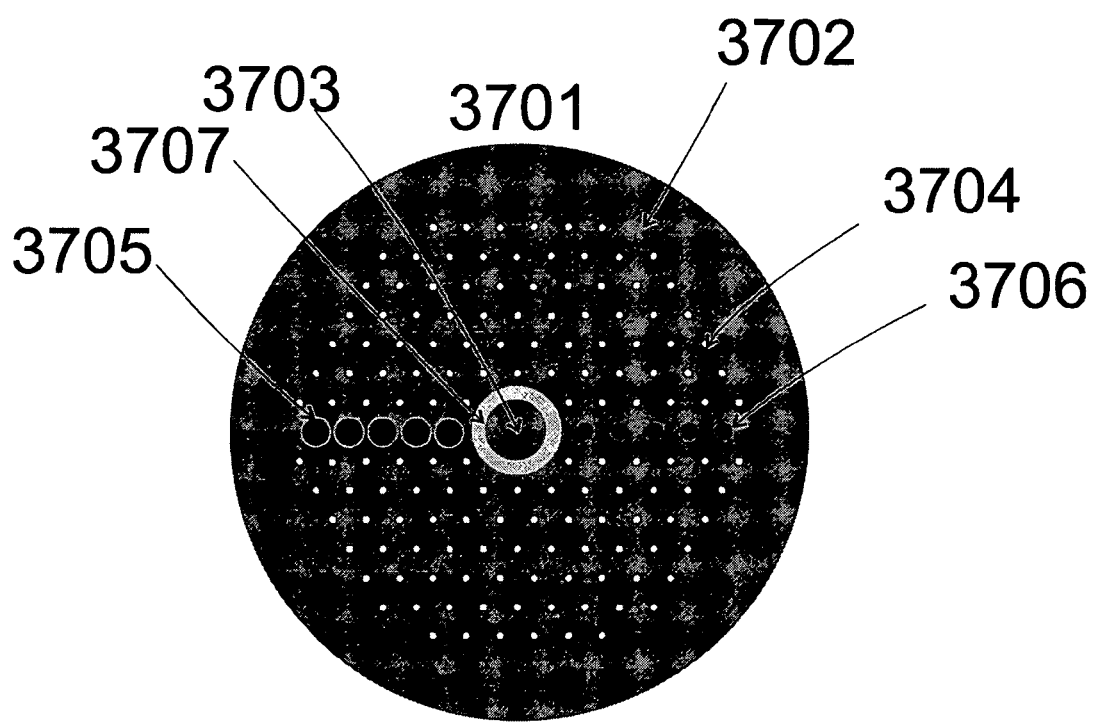
FIG. 37 shows a fiber design comprising a microstructured inner cladding region comprising a first and a second optical resonant structures with first and second up-doped inner cladding features arranged along a first and a second line, third inner cladding features (voids), and an annular shaped active region.
Figure 38:
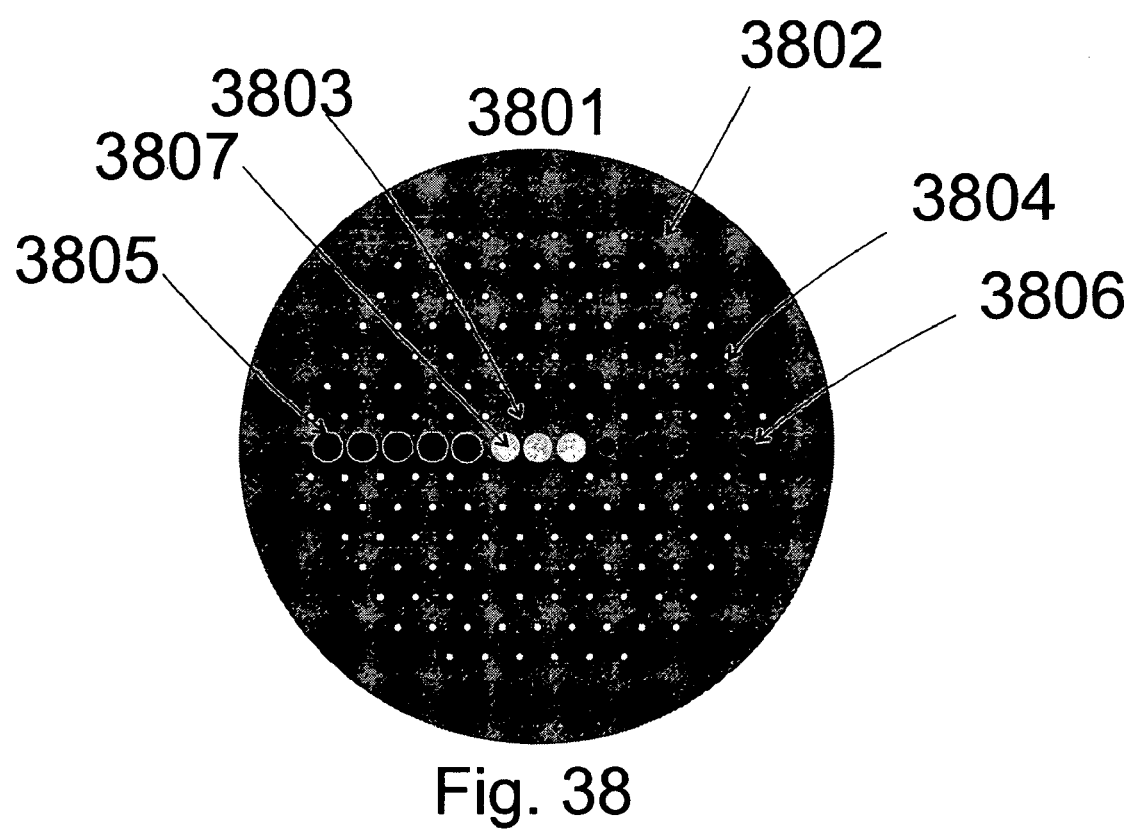
FIG. 38 shows a fiber design comprising a microstructured inner cladding region comprising a first and a second optical resonant structures with first and second up-doped inner cladding features arranged along a first and a second line, third inner cladding features (voids), and an active region comprising active features arranged along a line in said core region.
Figure 39:
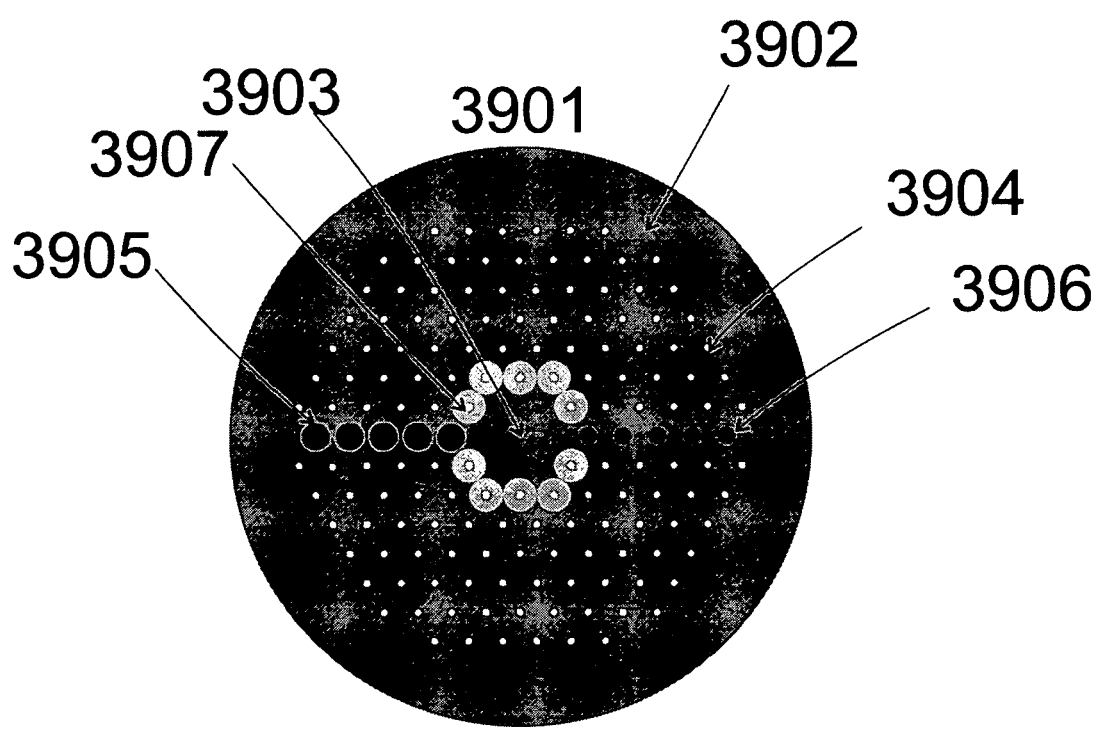
FIG. 39 shows a fiber design comprising a microstructured inner cladding region comprising a first and a second optical resonant structures with first and second up-doped inner cladding features arranged along a first and a second line, third inner cladding features (voids), and an active region comprising active features.

The optical fiber can be realized using the stack and draw technology, wherein rods and capillaries of a basis material, such as a silica material, are arranged in a stack. The stack can be drawn directly to fiber in a one-step process, or in a two-step process, where in the first step the stack is drawn to a preform which is overclad with e.g. a silica tube and then drawn to the fiber in a second step. With reference for FIG. 35 is described a preform 3501 for drawing an optical fiber according to the present invention. The preform has a region comprising core rods, and rods for defining the inner cladding features of the optical resonant structure(s), as well as rods and/or tubes for defining third inner cladding features. A region comprising tubes 3503 for an air cladding is included. The outer ring of material 3502 provides mechanical stability.

EXAMPLE 3

Figure 5:
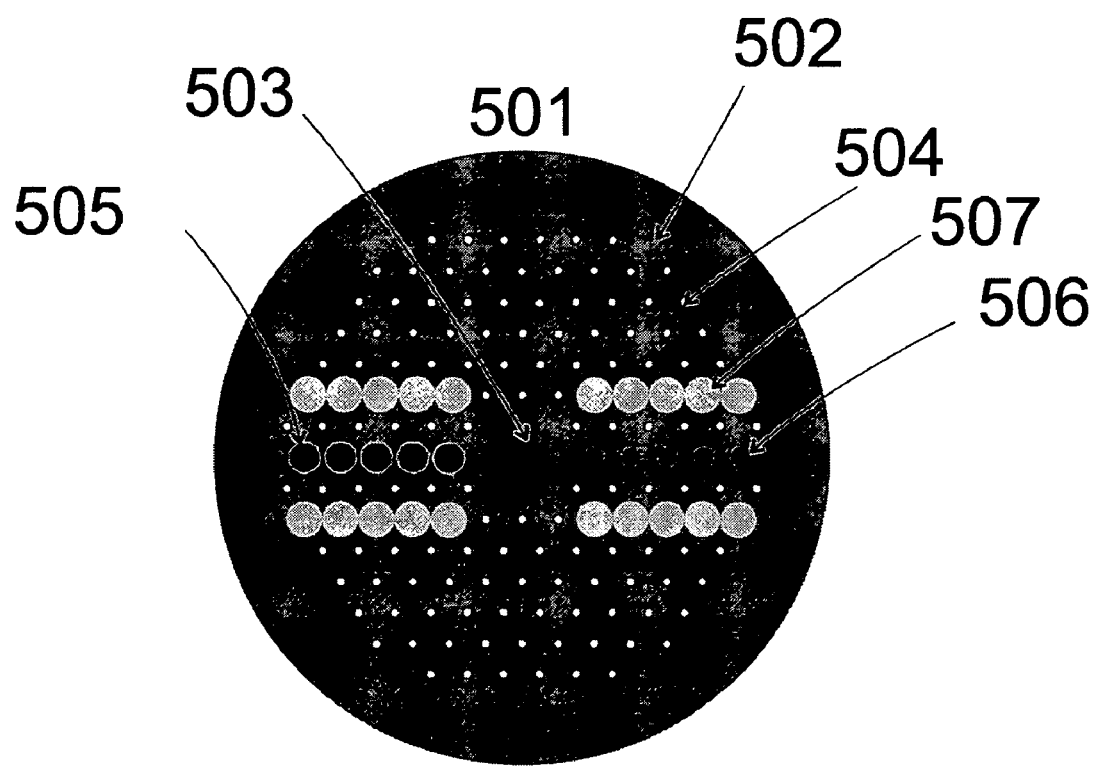
FIG. 5 shows a fiber design comprising a microstructured inner cladding region comprising a first and a second optical resonant structure with up-doped first and second inner cladding features arranged along a first and a second line, and stress applying inner cladding features surrounding both lines.
Figure 6:
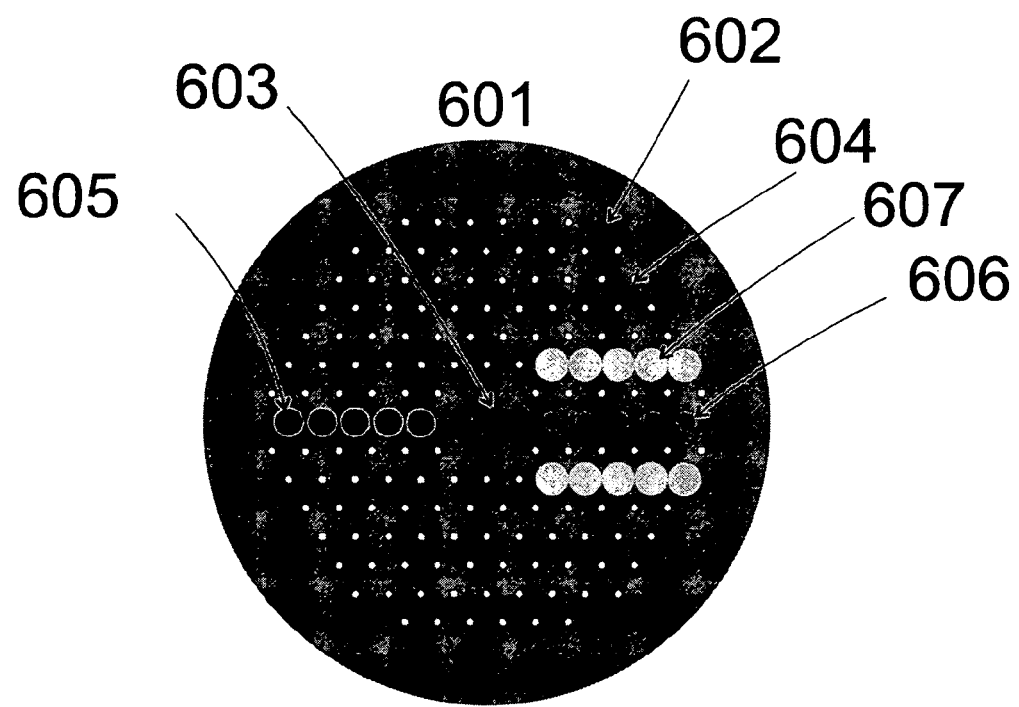
FIG. 6 shows a fiber design comprising a microstructured inner cladding region comprising a first and a second optical resonant structure with first and second up-doped inner cladding features arranged along a first and a second line, and stress applying inner cladding features surrounding one of said lines.
Figure 7:
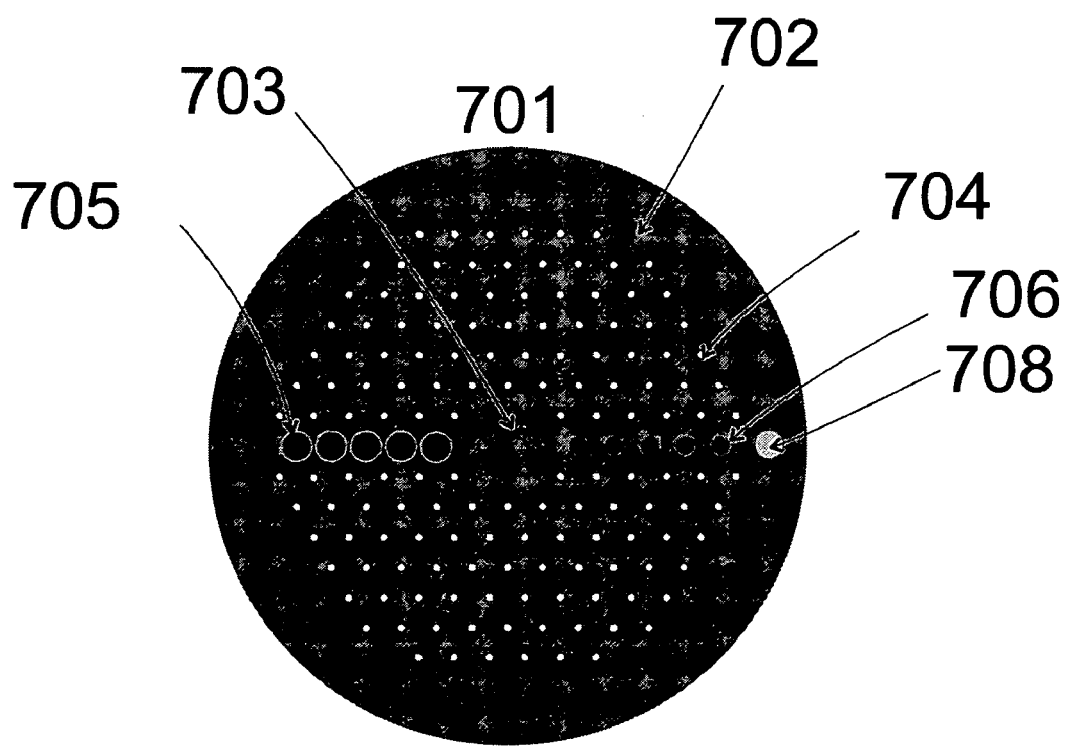
FIG. 7 shows a fiber design comprising a microstructured inner cladding region comprising a first and a second optical resonant structure with first and second up-doped inner cladding features arranged along a first and a second line and third inner cladding features (voids) arranged in a hexagonal lattice. An extra feature indicates a the orientation of the optical resonant structures.
Figure 10:
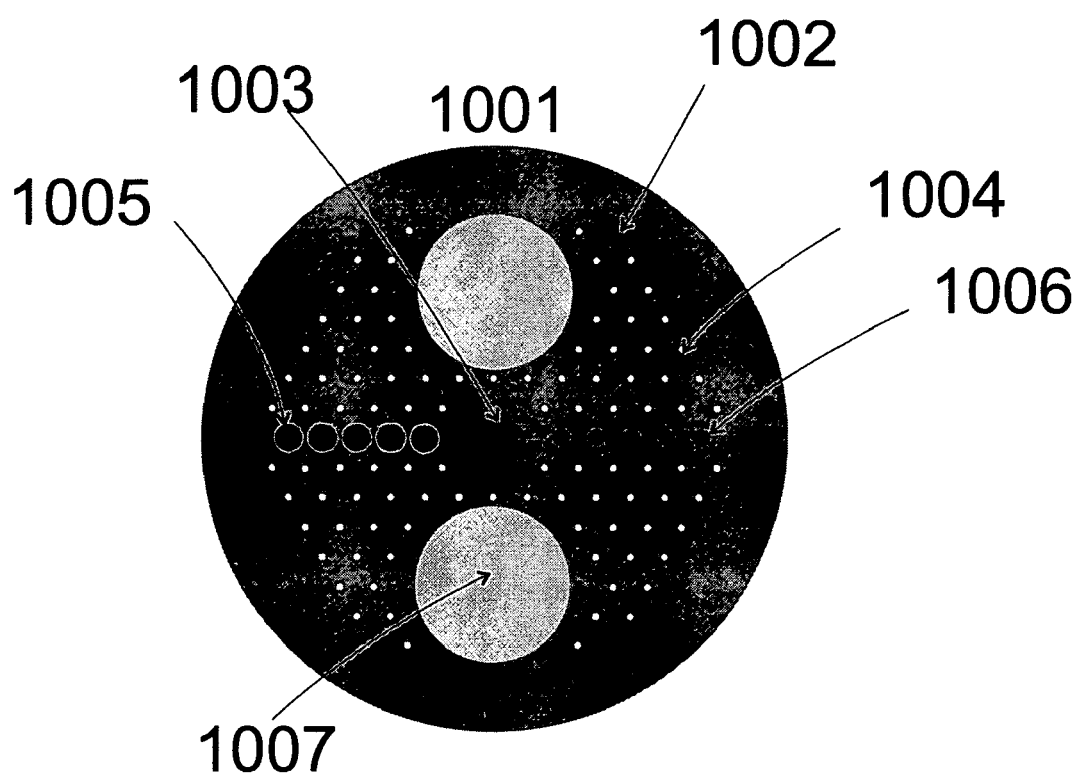
FIG. 10 shows a fiber design comprising a microstructured inner cladding region comprising a first and a second optical resonant structure with first and second up-doped inner cladding features arranged along a first and a second line, third inner cladding features (voids), and two stress applying elements.
Figure 11:
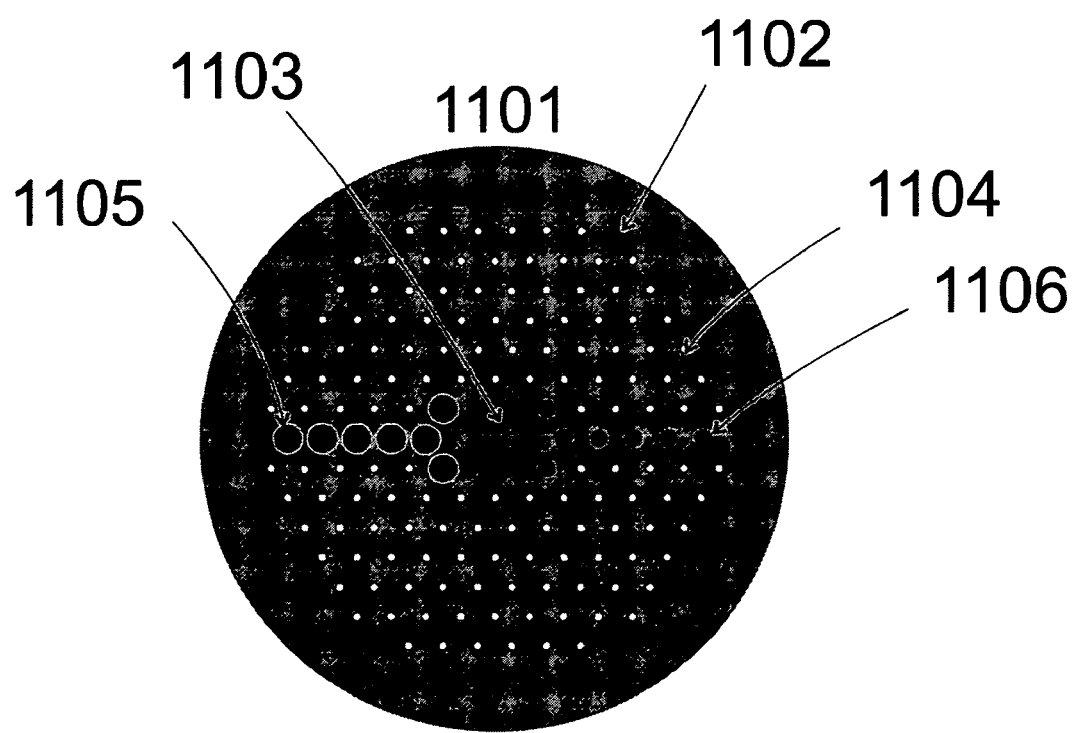
FIG. 11 shows a fiber design comprising a microstructured inner cladding region comprising a first and a second optical resonant structures with first and second up-doped inner cladding features and third inner cladding features (voids), said first and second inner cladding features being arranged along a first and a second line and tangentially in relation to said core region.
Figure 12:
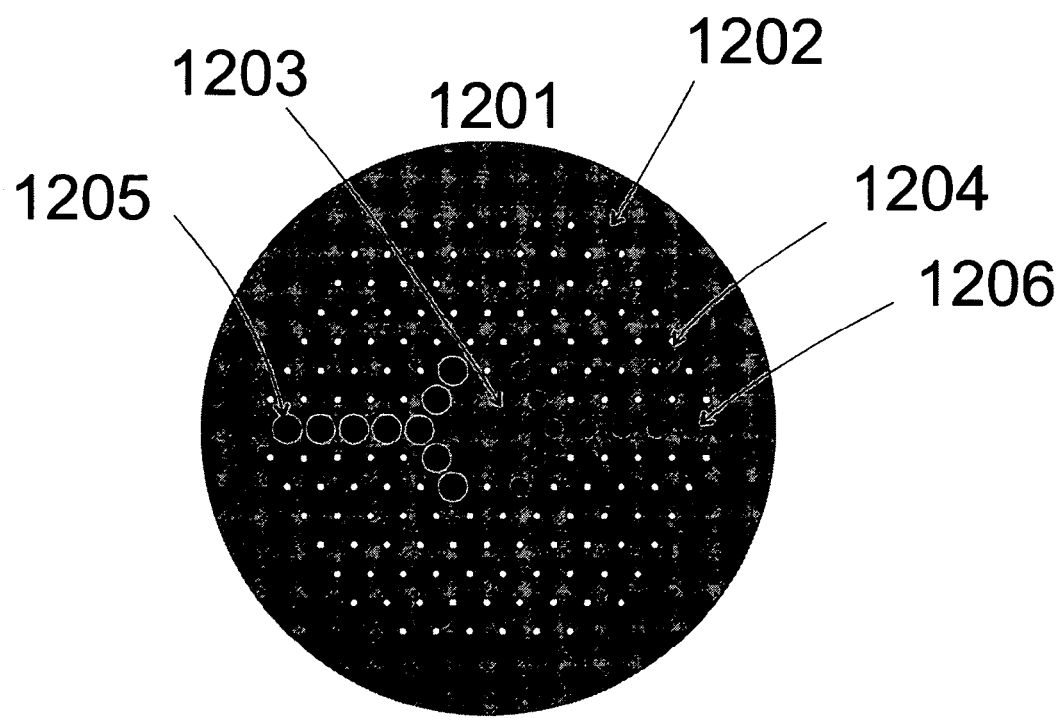
FIG. 12 shows a fiber design comprising a microstructured inner cladding region comprising a first and a second optical resonant structures with first and second up-doped inner cladding features and third inner cladding features (voids), said first and second inner cladding features being arranged along a first and a second line and tangentially in relation to said core region.

In some cases it may be attractive to induce PM or/and PZ properties or to enhance PM or/and PZ properties already exhibited by a fiber. The optical fiber according to the present invention may also be designed to have a stress field (birefringence) perpendicular to the axis of the optical resonant structures. The stress field enhance or introduce polarization maintaining or/and polarizing properties to the fiber. The stress field can be realized by including stress applying elements in addition to the inner cladding features. With reference to FIGS. 5, 6, and 10 is described fiber designs realizing a stress field perpendicular to the optical resonant structures. The optical fiber 501, 601, 1001 has two collinear arranged optical resonant structures with first inner cladding features 505, 605, 1005 and second inner cladding features 506, 606, 1006, respectively. The stress applying elements 507, 607, 1007 may be arranged in several different configurations. In FIG. 5, two rows of stress applying elements 507 surround both the first and the second optical resonant structures. In FIG. 6, two rows of stress applying elements 607 surrounds only one of the optical resonant structures. Enhanced PM properties can also be realized by placing two stress applying elements 1007 on a line perpendicular to the optical resonant structures.

In a silica based realization of the optical fiber according to the present invention, the stress applying elements can be boron doped silica glass.

EXAMPLE 4

Figure 8:
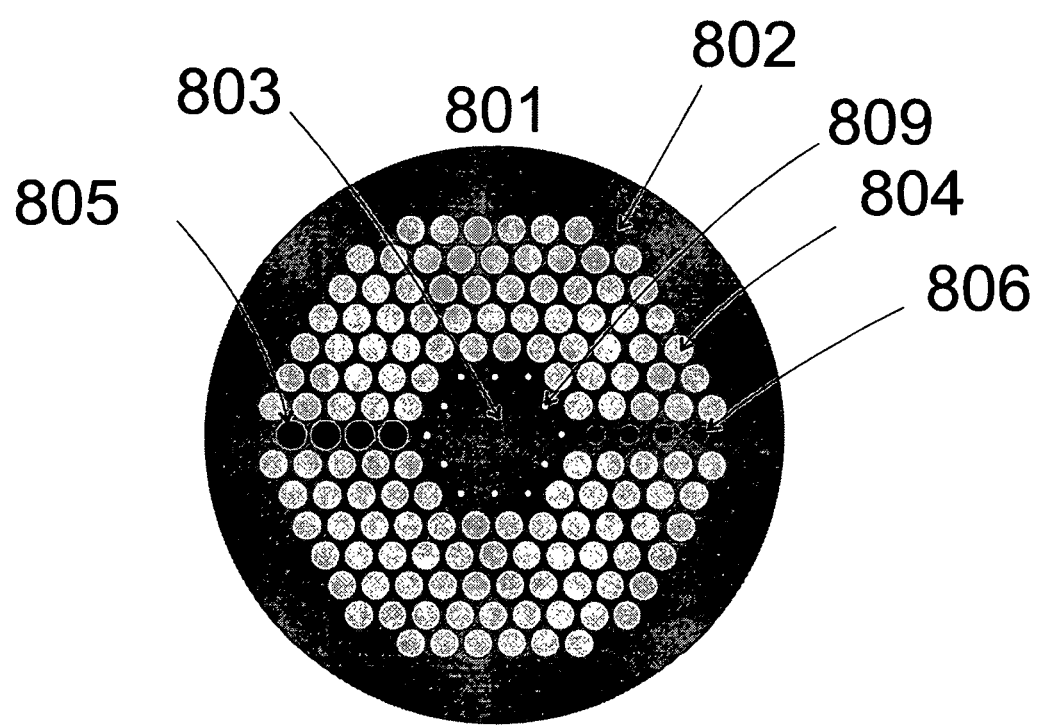
FIG. 8 shows a fiber design comprising a microstructured inner cladding region comprising a first and a second optical resonant structure with first and second up-doped inner cladding features arranged along a first and a second line and down-doped third inner cladding features. Closest to the fiber core region are fourth inner cladding features.
Figure 9:
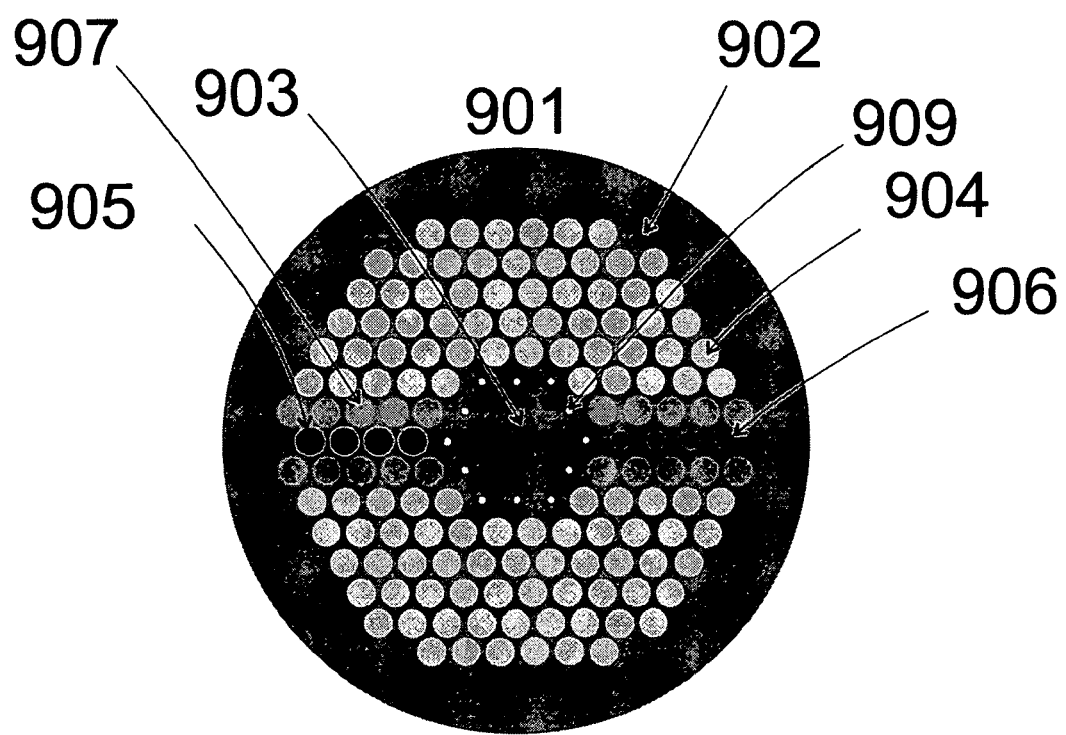
FIG. 9 shows a fiber design comprising a microstructured inner cladding region comprising a first and a second optical resonant structure with first and second up-doped inner cladding features arranged along a first and a second line, down-doped third inner cladding features, and stress-applying elements surrounding the first and second inner cladding features.
Figure 33:
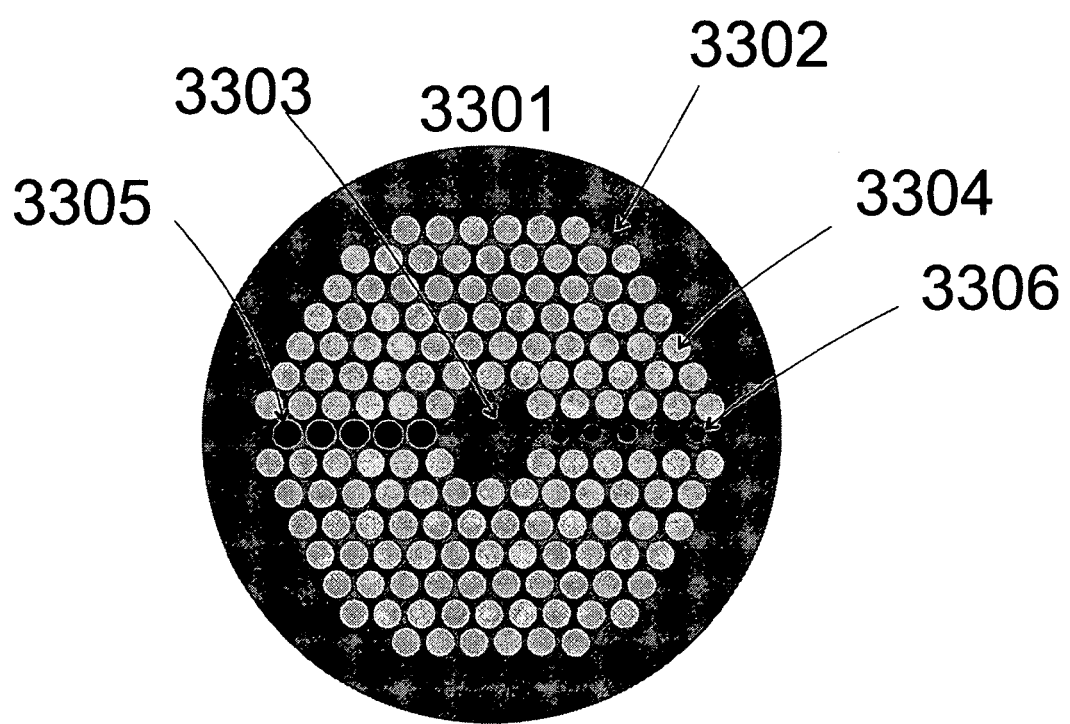
FIG. 33 shows a fiber design comprising a microstructured inner cladding region comprising down-doped third inner cladding inner cladding features and a first and a second optical resonant structure with first and second up-doped inner cladding features arranged along a first and a second line.

The third inner cladding features of a fiber may be realized by either introducing voids in the inner cladding material or by doping the inner cladding material. For an optical fiber 801, 901, 3301 with silica inner cladding basis material, low-index solid third inner cladding features 804, 904, 3304 can be provided by Fluorine-doping the silica. In the fiber designs of FIGS. 8, 9, and 34, the third inner cladding features 804, 904, 3304 are arranged in a hexagonal lattice cross sectional separated by the first 805, 905, 3305 and second 806, 906, 3306 inner cladding features that couples light from the core region 803, 903, 3303, to the first outer cladding 802, 902, 3302 which in the fiber design illustrated in FIGS. 8, 9, and 33 acts as the light sink. Fibers according to the present invention may have inner cladding features that are not either providing a strong coupling of core modes to a light sink (first and second inner cladding features) or a strong confinement of the core mode (third inner cladding features). FIGS. 8 and 9 illustrate fiber designs, wherein fourth inner cladding features 809, 909 are arranged in a ring around the core region 803, 903. The fourth inner cladding features are voids than can collapse if the optical fiber is heated. If this heating is applied locally or as a part of a tapering process, the collapse of the fourth inner cladding features may result in mode expansion of e.g. the fundamental core mode. The polarization properties of a fiber 901 with solid third inner cladding features 904 can be enhanced by placing stress applying elements 907 around the optical resonant structures. In a silica based realization of the optical fiber according to the present invention, the stress applying elements can be boron doped silica glass.

EXAMPLE 5

In order to enhance the resonant coupling between modes in the core region and the light sink(s), the optical resonant structures of a fiber according to the present invention can be designed to at least partly surround the core region. FIGS. 11 to 15, 31 and 32 illustrate different designs the optical fiber 1101, 1201, 1301, 1401, 1501, 3101, 3201 with inner cladding features arranged in a hexagonal lattice, where has optical resonant structures comprising inner cladding features arranged tangential in relation to the core region 1103, 1203, 1303, 1403, 1503, 3103, 3203. Third inner cladding features 1104, 1204, 1304, 1404, 1504, 3104, 3204 with a low diameter to pitch ratio are arranged in a hexagonal lattice to provide LMA properties to the fibers. In FIGS. 11, 12, 31 and 32 first inner cladding features 1105, 1205, 3105, 3205 and second inner cladding features 1106, 1206, 3106, 3206 are arranged in two optical resonant structures, each structure having inner cladding features arranged along a radial extending line and tangentially in relation to the core region 1103, 1203, 3103, 3203. The tangentially arranged inner cladding features enhance the resonant coupling between the core region and the light sink(s). The resonant coupling provided by an optical resonant structure with a total of five first inner cladding features 1205, 3105, 3205 arranged in close proximity to the core region 1203, 3203, 3203 may provide a stronger resonant coupling than an optical resonant structure with a total of three inner cladding features 1105 in close proximity to the core region 1103. The latter may again provide a stronger resonant coupling than an optical resonant structure which only comprises one inner cladding feature 205 in close proximity to the core region 203. The strength of the resonant coupling may be reduced further if the optical resonant structure(s) does not comprise inner cladding features arranged in the first ring surrounding the core regions as seen in the fiber 3401 depicted in FIG. 34, where the first ring of the hexagonal arrangement of inner cladding features surrounding the core region has 6 third inner cladding features 3404 and the first and second optical resonant structures holds four first inner cladding features 3405 and four second inner cladding features 3406, respectively The Single Mode (SM) and bend performance of the optical fiber 3201 may be improved even further if the core region 3203 comprises a high index core feature.

Figure 13:
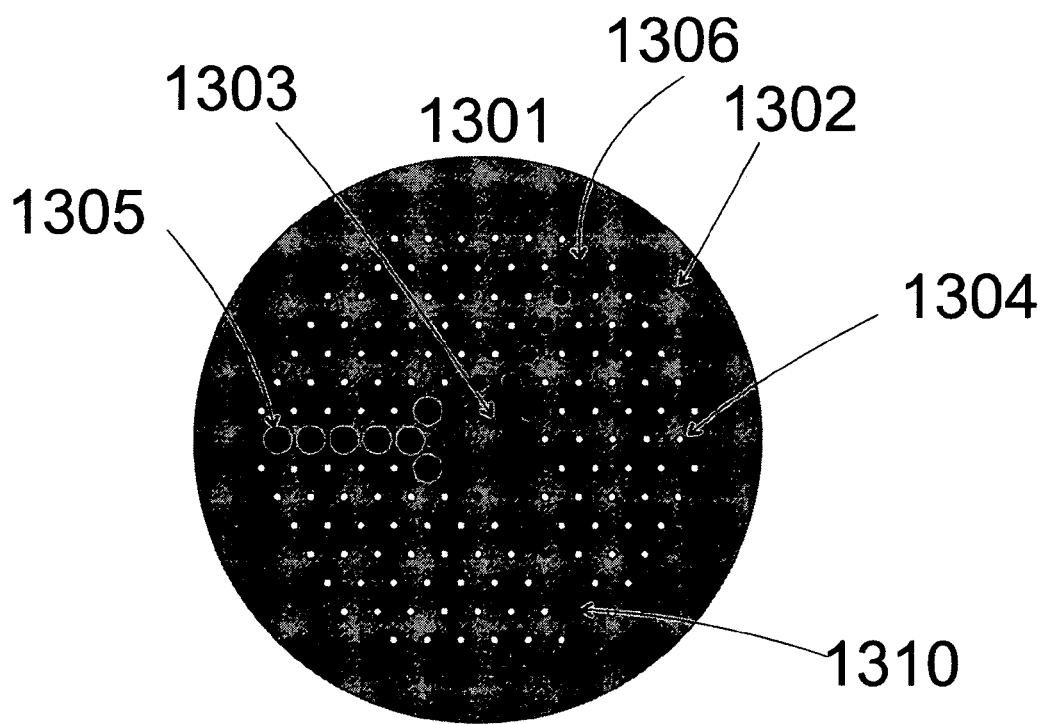
FIG. 13 shows a fiber design comprising a microstructured inner cladding region comprising three optical resonant structures with different up-doped inner cladding features arranged along there lines and third inner cladding features (voids), said up-doped inner cladding features being arranged along three lines and tangentially in relation to said core region.
Figure 14:
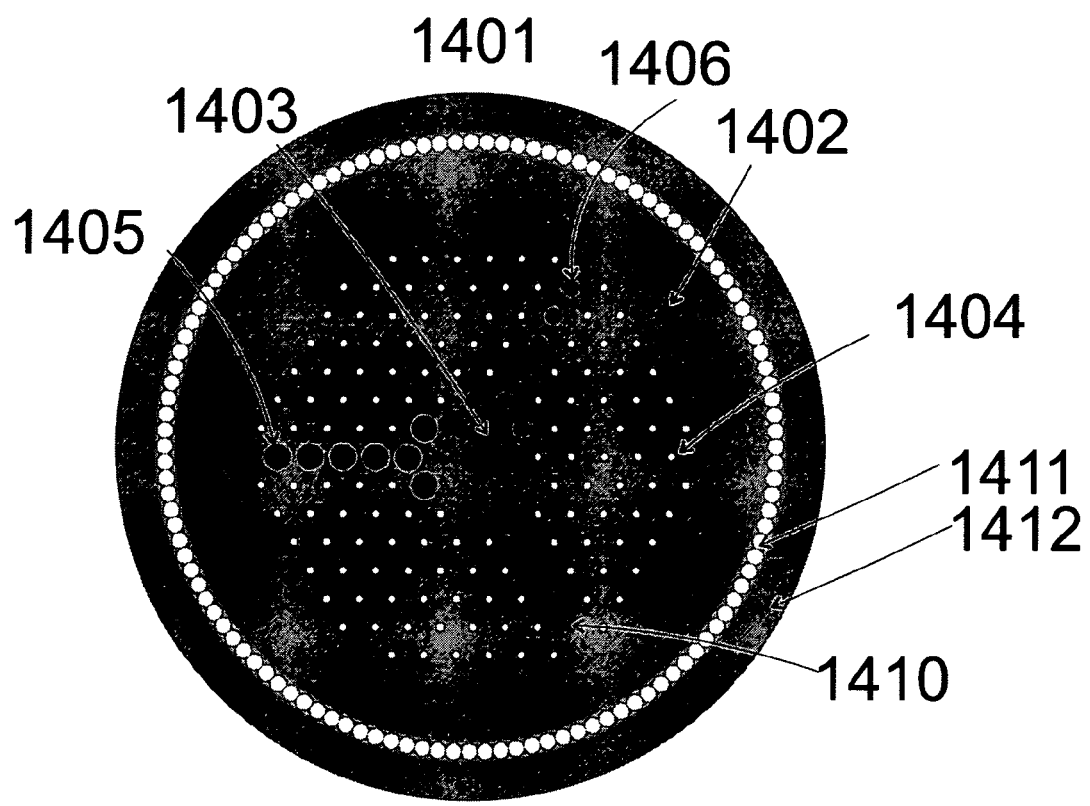
FIG. 14 shows a fiber design comprising a microstructured inner cladding region comprising three optical resonant structures with different up-doped inner cladding features arranged along three lines and third inner cladding features (voids), said up-doped inner cladding features being arranged along three lines and tangentially in relation to said core region. An outer cladding comprising an air cladding surrounds the inner cladding region.
Figure 15:
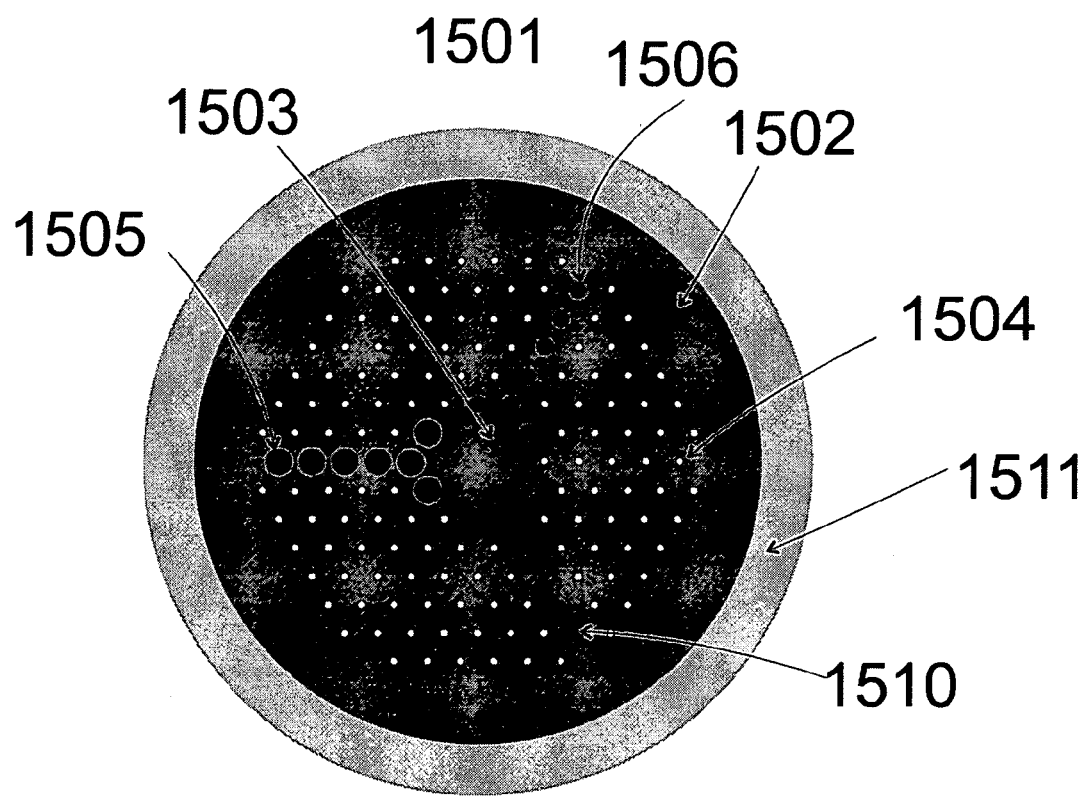
FIG. 15 shows a fiber design comprising a microstructured inner cladding region comprising three optical resonant structures with different up-doped inner cladding features arranged along three lines and third inner cladding features (voids), said up-doped inner cladding features being arranged along three lines and tangentially in relation to said core region. An outer cladding comprising a solid region surrounds the microstructured inner cladding.
Figure 16:
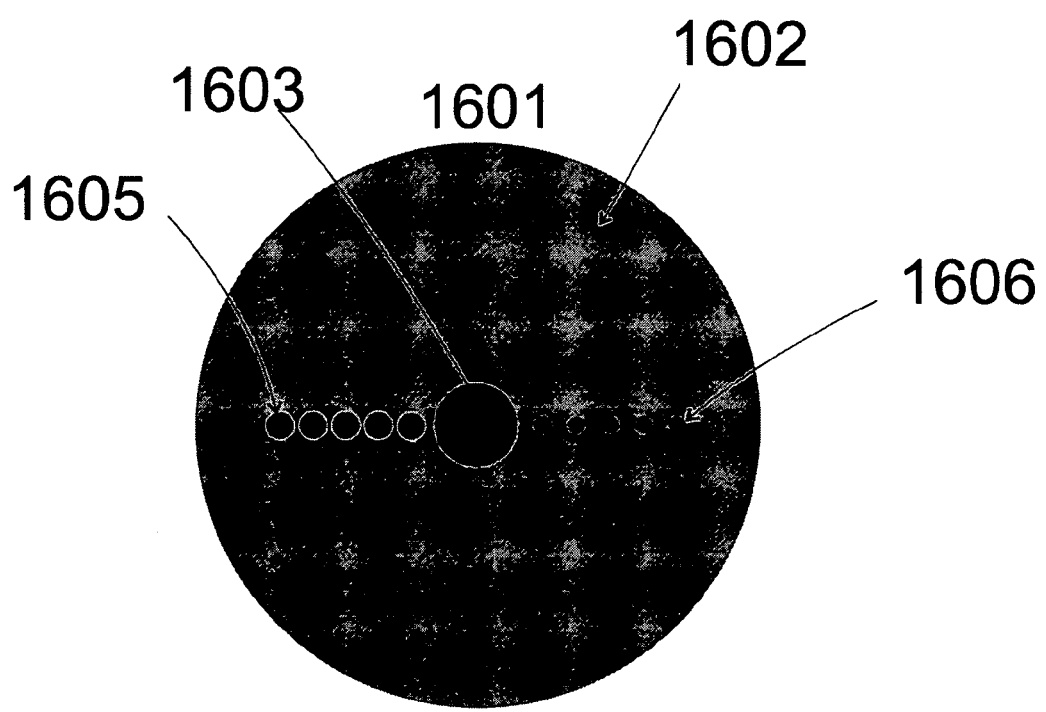
FIG. 16 shows a fiber design comprising an all-solid inner cladding region comprising first and second up-doped inner cladding features arranged along a first and a second line in a first and a second optical resonant structure.
Figure 17:
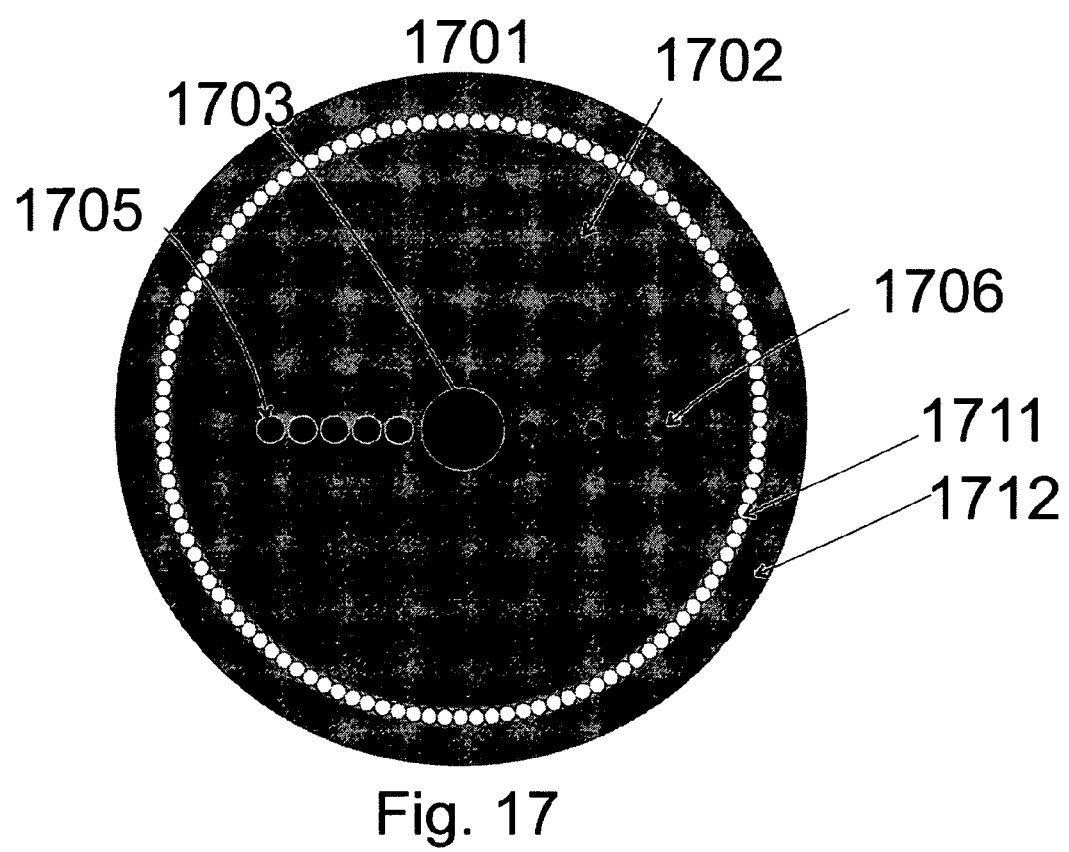
FIG. 17 shows a fiber design comprising an all-solid inner cladding region comprising first and second up-doped inner cladding features arranged along a first and a second line in a first and a second optical resonant structure. An outer cladding comprising an air cladding surrounds the inner cladding region.
Figure 18:
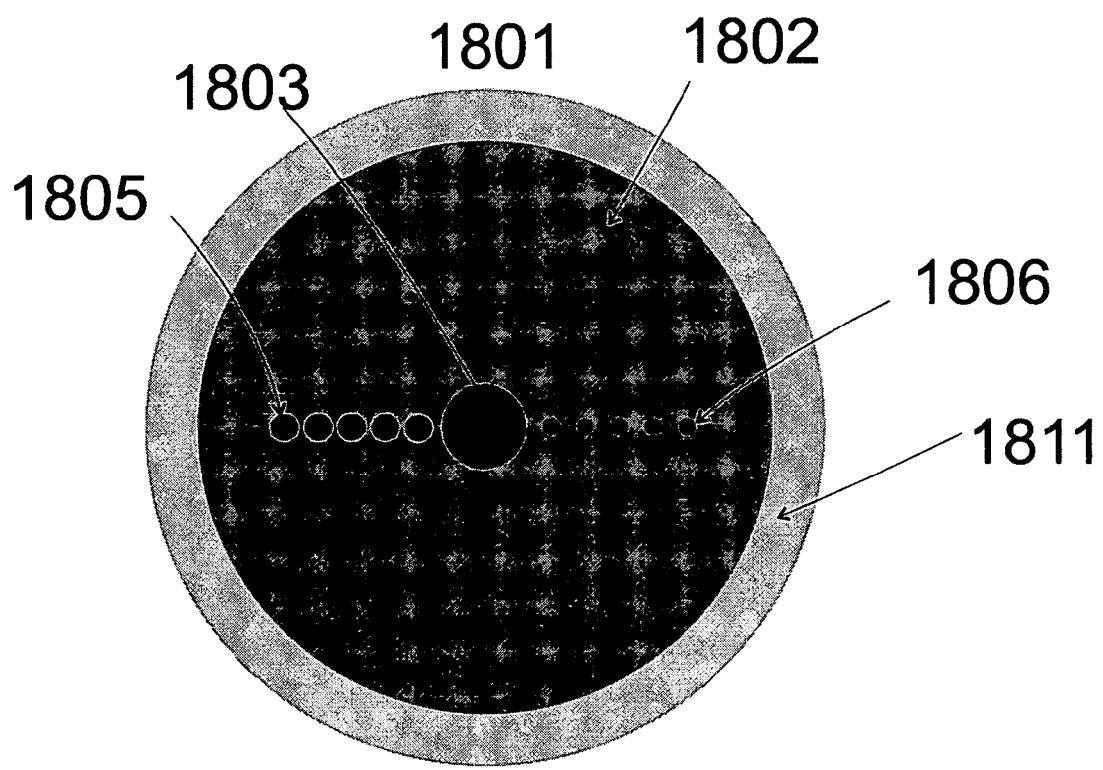
FIG. 18 shows a fiber design comprising an all-solid inner cladding region comprising first and second up-doped inner cladding features arranged along a first and a second line in a first and a second optical resonant structure. An outer cladding comprising a solid outer cladding surrounds the inner cladding region.

The arrangement of inner cladding features that provides a resonant coupling between the core region and the light sink(s) is not limited to two optical resonant structures. Referring to FIGS. 13 to 15, the optical fiber 1301, 1401, 1501 according to the present invention may comprise inner cladding features 1305, 1306, 1310, 1405, 1406, 1410, 1505, 1506, 1510, arranged in three optical resonant structures, where each structure comprises inner cladding features arranged along radial extending lines and tangentially in relation to the core region 1303, 1403, 1503. The three optical resonant structures couple light from the core region 1303. 1403, 1503 to a first outer cladding region 1302, 1402, 1502 having a refractive index above the effective refractive index of the inner cladding region.

Figure 31:
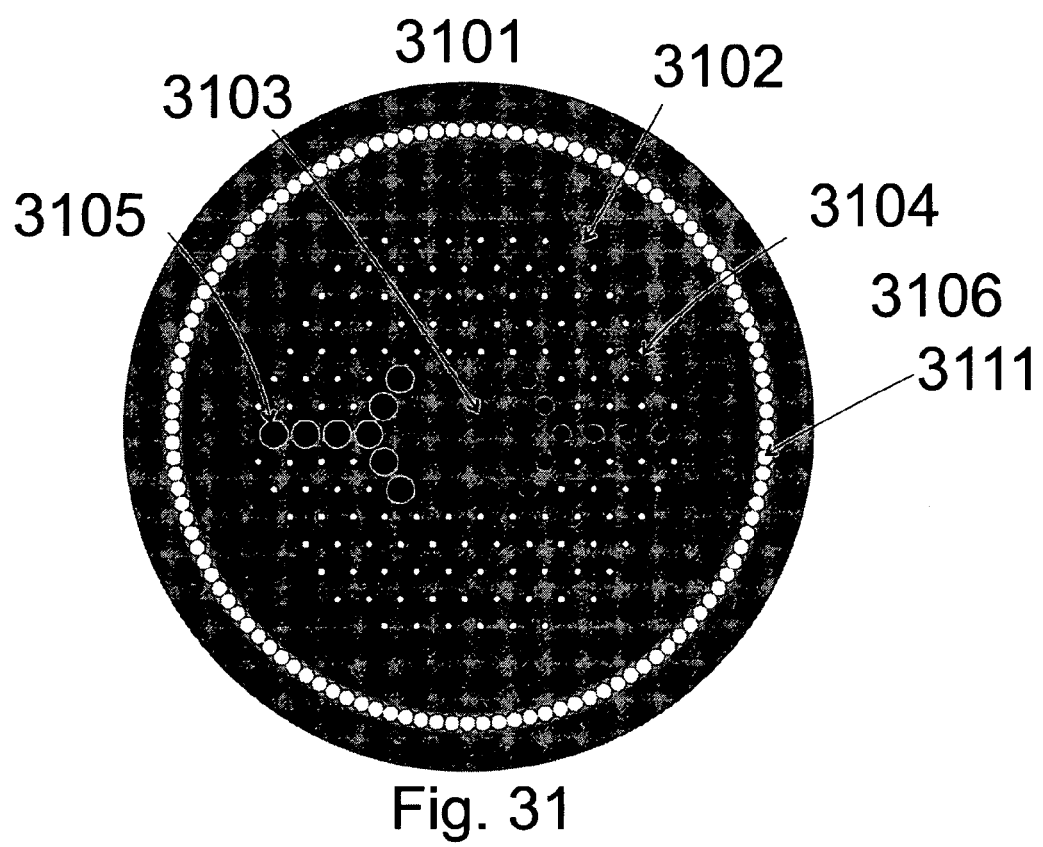
FIG. 31 shows a fiber design comprising a microstructured inner cladding region comprising a first and a second optical resonant structure with first and second up-doped inner cladding features arranged along a first and a second line and third inner cladding features (voids), said first and second inner cladding features being arranged along a first and a second line and tangentially in relation to said core region, and an outer cladding comprising an air cladding.
Figure 32:
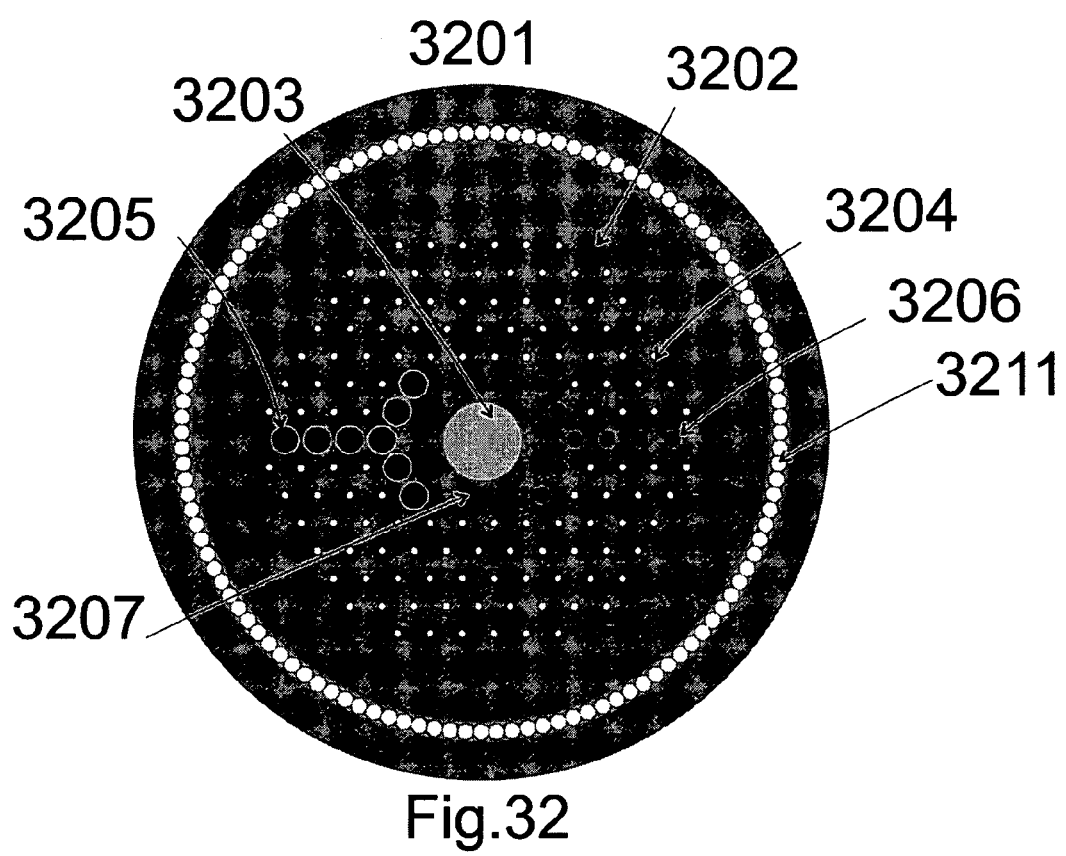
FIG. 32 shows a fiber design comprising a microstructured inner cladding region comprising a first and a second optical resonant structure with first and second up-doped inner cladding features arranged along a first and a second line and third inner cladding features (voids), said first and second inner cladding features being arranged along a first and a second line and tangentially in relation to said core region. The central part of the core region has higher refractive index compared to the inner cladding basis material.

The microstructured inner cladding comprising the optical resonant structures and a hexagonal arrangement of third inner cladding features 1404, 1504, 3104, 3204 and the first outer cladding 1402, 1502, 3102, 3202 may be surrounded by a low index second outer cladding region 1411, 1511, 3111, 3211 to provide a stronger confinement of pump light to the inner cladding region of an active fiber. In FIGS. 14, 31 and 32 are illustrated fiber designs, wherein the second outer cladding region comprises an air cladding 1411, 3111, 3211 surrounded by a solid ring 1412 surrounding the air cladding to provide mechanical stability.

EXAMPLE 6

The scope of the present invention is not limited to fibers, wherein the inner cladding region comprises a plurality of third inner cladding features. In FIGS. 16 to 19 are illustrated fiber designs 1601, 1701, 1801, 1901, where the core region 1603, 1703, 1803, 1903 is surrounded by an inner cladding region which besides the inner cladding features 1605, 1606, 1705, 1706, 1805, 1806, 1905, 1906 of the optical resonant structures, is substantially homogeneous. Confinement of an optical signal that propagates in the core region can be facilitated by an index step between a core region comprising up-doped inner cladding basis material and the inner cladding comprising inner cladding basis material. In fiber designs adapted to amplifier or laser applications, an outer cladding structure 1711, 1712, 1811, 1911, is often arranged to surround the inner cladding structure. An air cladding 1711, 1911 can be designed to provide a very high Numerical Aperture to the inner cladding region, but is fragile and a solid outer ring 1712, is often arranged to surround the air cladding 1711, 1911 to provide mechanical stability. An air cladding 1711, 1911 is often included in the fiber design to confine a pump signal propagating through the inner cladding region of the fiber.

Figure 19:
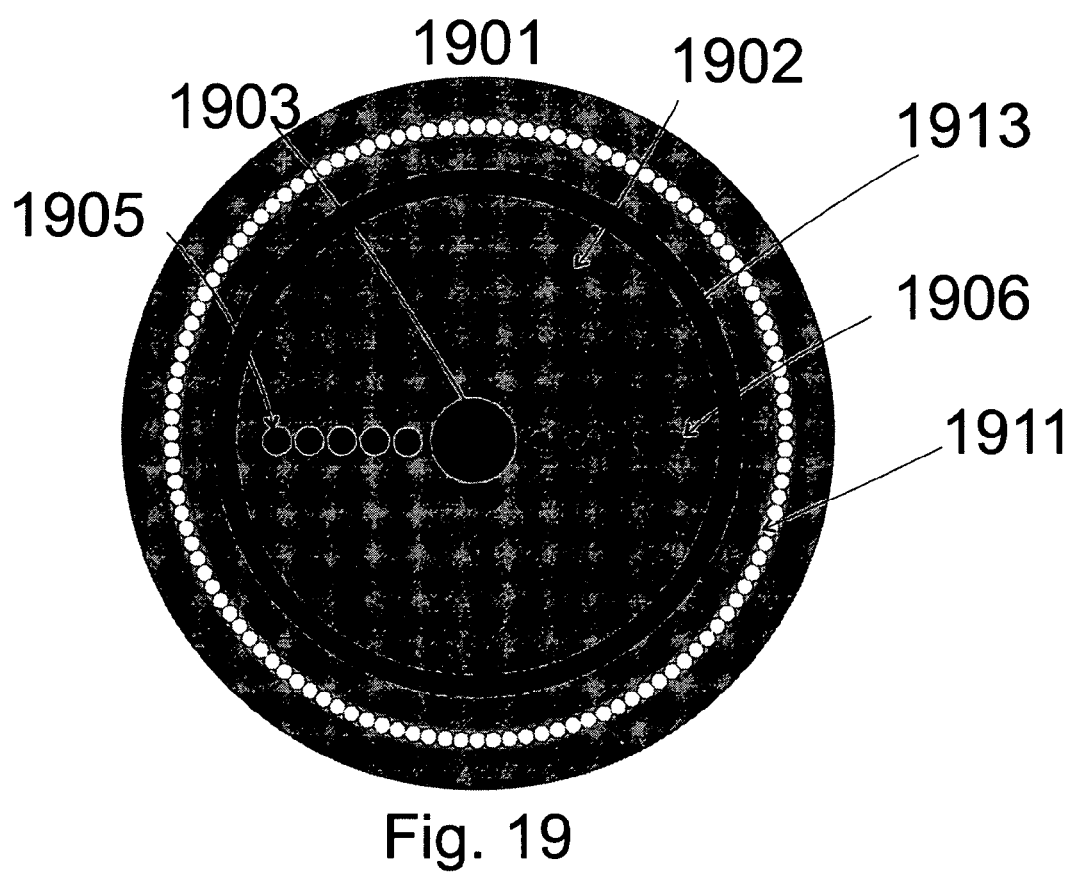
FIG. 19 shows a fiber design comprising an all-solid inner cladding region comprising first and second up-doped inner cladding features arranged along a first and a second line in a first and a second optical resonant structure, a high index ring, and an air cladding.
Figure 20:
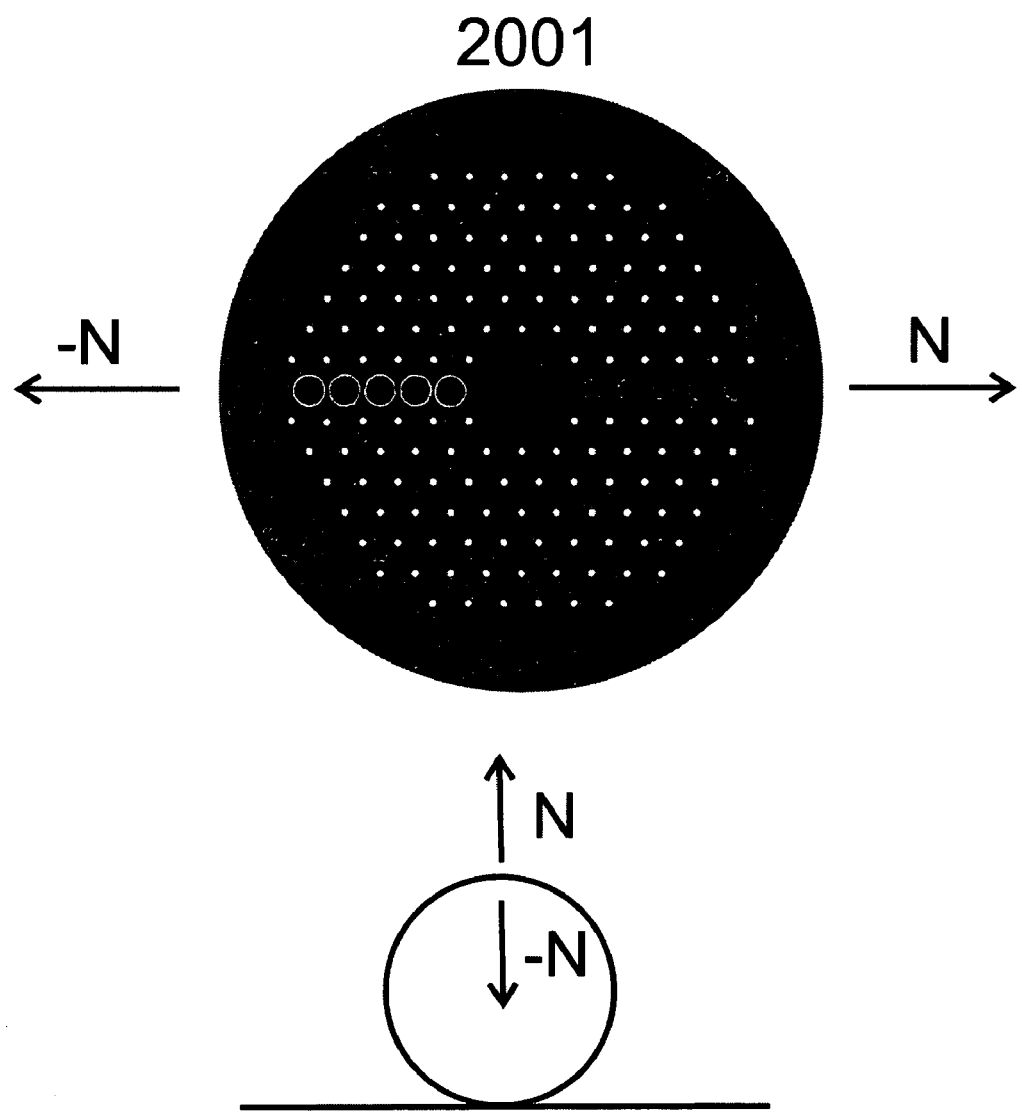
FIG. 20 shows a schematic illustration of one orientation (N, −N) of the optical resonant structures in a coiled fiber according to the present invention.

In general, there may problems relating to a resonant the coupling of light back into the core region from the optical resonant structure. This is especially the case if there is no structure in the fiber that the light can be coupled to from the resonant optical structure. Such a reverse coupling can be mitigated by introducing a light sink in the fiber. In FIG. 19 is depicted a light sink comprising an up-doped coherent ring 1913 surrounding the inner cladding region and allowing light coupled from the core region to be coupled into the coherent ring 1913. In a silica based fiber, the refractive index of the up-doped core region and/or the up-doped ring can be increased by adding Germanium or Phosphorous to the silica glass. When adding only index raising elements, such as Germanium and Phosphorous to the ring-formed light sink, the light coupled from the core region to the sink can propagate along the fiber in the sink and from there be coupled back into the core region. This effect can be mitigated if the sink comprises an absorbing element that can absorb light coupled to the sink. In silica based optical fibers for laser applications operated around 1064 nm the element Samarium is often used as the absorbing element. The Samarium can then be located in at least a part of the light sink. The light sink can also be one of the first inner cladding elements 1605, 1606, 1705, 1706, 1805, 1806, 1905, 1906.

EXAMPLE 7

Figure 21:
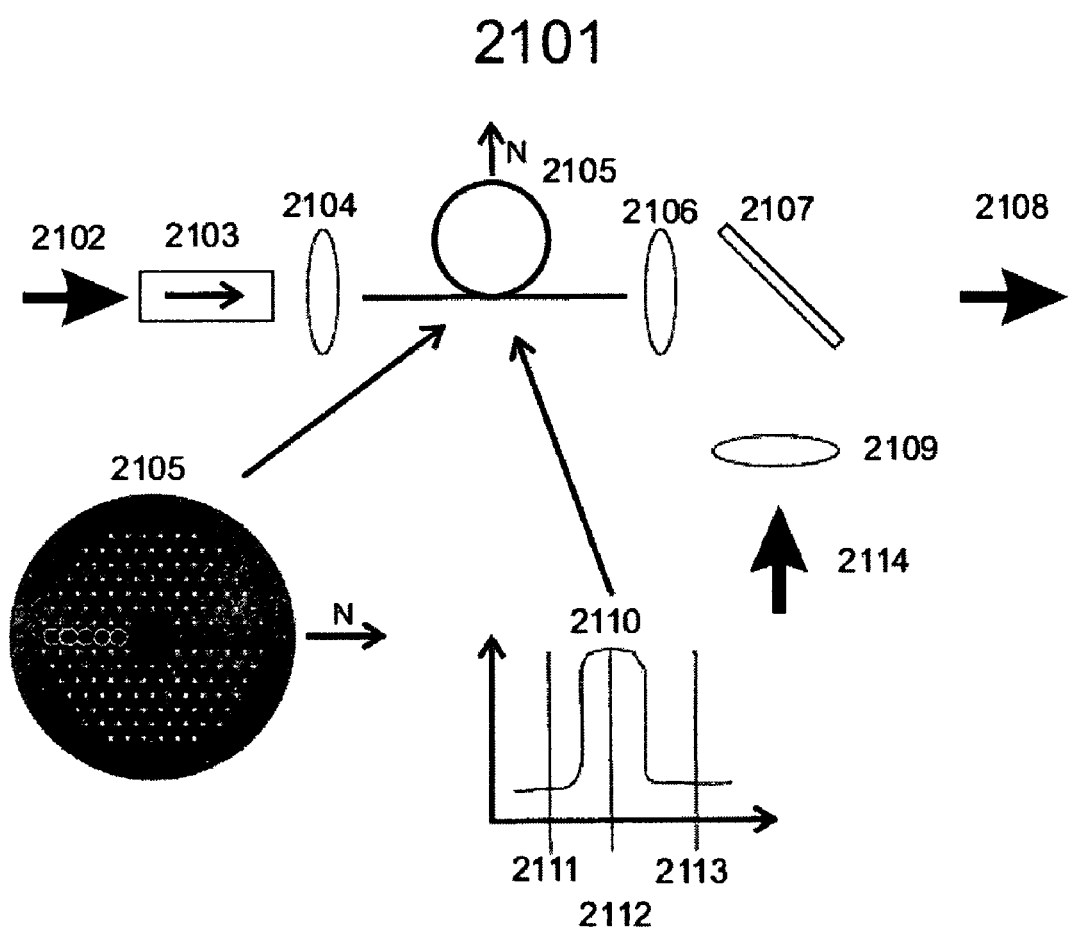
FIG. 21 shows a schematic illustration of a fiber amplifier system utilizing a fiber according to the present invention as the amplifier fiber.

The fiber according to the present invention may also find its use as amplifier fiber 2105 in a pulsed amplifier configuration 2101, where the peak power is often several orders of magnitudes higher than in CW lasers, and nonlinear effects set in already at the amplifier level. In FIG. 21 is illustrated a system design, wherein the fiber according to the present invention may be capable of suppressing SRS and Four-Wave Mixing in the amplifier fiber 2105, such that higher peak powers can be extracted from the amplifiers. A seed laser signal 2102 is sent through an isolator 2103 and is coupled into the amplifier fiber 2105 by a lens 2104. A pump signal 2109 is coupled into the fiber 2105 through a lens 2114, a pump reflector 2107 and a lens 2106. After being amplified in the fiber 2105, the optical signal is collected by the lens 2106 and the laser signal 2108 exits the system 2101. The optical fiber 2105 is arranged in a coil, where a first optical resonant structure is directed substantially along a vector N which points away from the center of the coil and a second optical resonant structure is directed substantially in the opposite direction. The up-doped first inner cladding features of the first optical resonant structure has a diameter (and hence an effective refractive index) which is lower than the diameter of the up-doped second inner cladding features of the second optical resonant structure. The transmission spectrum 2110 shows that the wavelength of the signal 2112 from the seed laser is inside the effective transmission pass band of the optical fiber. Signals at either a higher wavelength 2113 or a lower wavelength 2111 will be resonantly coupled out of the core region and the fiber does hence not guide optical signals at these wavelengths.

Figure 22:
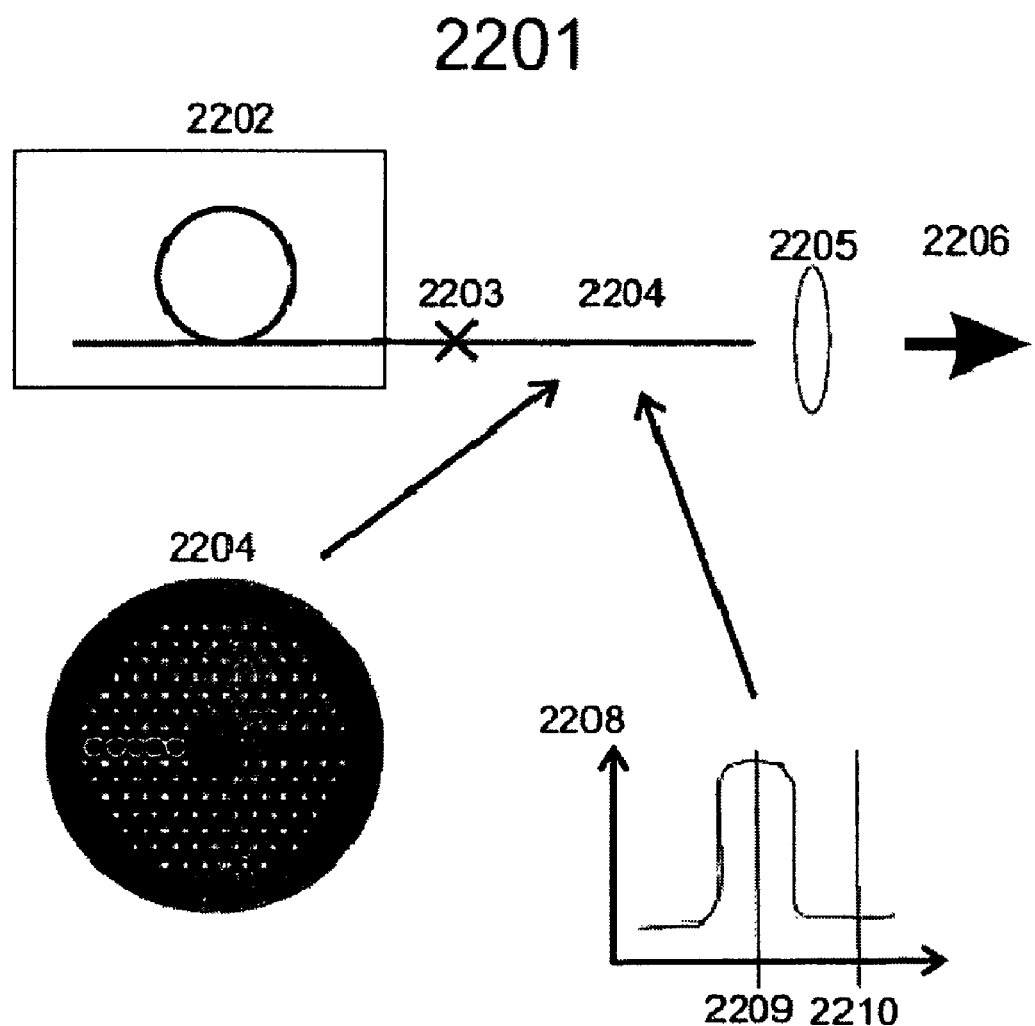
FIG. 22 shows a schematic illustration of a fiber laser/amplifier system utilizing a fiber according to the present invention as the delivery fiber.

The optical fiber according to the present invention can be designed to suppress nonlinear effects, such as Stimulated Raman Scattering (SRS). The threshold for nonlinear effects decreases with increasing length of the laser and delivery fiber and is a limiting factor as the power of CW lasers increases. A fiber designed to suppress nonlinear effects can be used as passive delivery fiber as illustrated in FIG. 22. Such a fiber 2204 can be used in relation to for instance high-power CW lasers assisted material processing and in other systems, where long lengths of delivery fibers may be needed in order to have a flexible laser solution with a fast turn-around time. The suppression of nonlinear effects increases the power handling capabilities of the delivery system 2201. A high power fiber laser/amplifier 2202 is spliced 2203 to a section of the fiber 2204 according to the present invention which here is used as passive delivery fiber. The transmission spectrum 2208 of the fiber 2204 shows an effective transmission pass band which comprises the laser wavelength 2209 but not signals at higher wavelengths 2210 such as a generated Raman signal. Signals generated by non-linear effects in the fiber are hence suppressed significantly. Light emerging from the fiber at the distal end relative to the splice is collected by a lens 2005 and propagates outside the fiber towards for instance an object which is to be e.g. laser cut.

In one embodiment, the fiber is capable of efficiently suppressing Amplified Spontaneous Emission (ASE) primarily on the short-wavelength side of the signal wavelength but alternatively also on the long-wavelength side. When no steps are taken to suppress the ASE, it may give rise to self-pulsing or self-lasing in amplifiers operating with high gain (>20 dB) or low rep-rate (<100 kHz), whereby the ASE can destroy the seed laser and/or the pumps of the amplifiers system. Prior art amplifiers are often divided in several sections with intermediate filters between each section to eliminate ASE. This approach increases amplifier complexity and cost. With the fiber according to the present invention the effects caused by the ASE can be mitigated significantly in a single-fiber configuration.

EXAMPLE 8

The coil diameter influence on the transmission spectrum of the fiber depends strongly on the bend direction of the coil relative to the orientation of the optical resonant structure(s). In a first arrangement, the optical fiber is arranged in a coil, where a first optical resonant structure is directed substantially along a vector N which points away from the center of the coil and a second optical resonant structure is directed substantially in the opposite direction. The up-doped first inner cladding features of the first optical resonant structure has a diameter (and hence an effective refractive index) which is lower than the diameter of the up-doped second inner cladding features of the second optical resonant structure. When the fiber is coiled according to the first arrangement, the change in the transmission spectrum is less than what is seen in a LMA fiber not having the first and second optical resonant structures according to the present invention.

Figure 24:
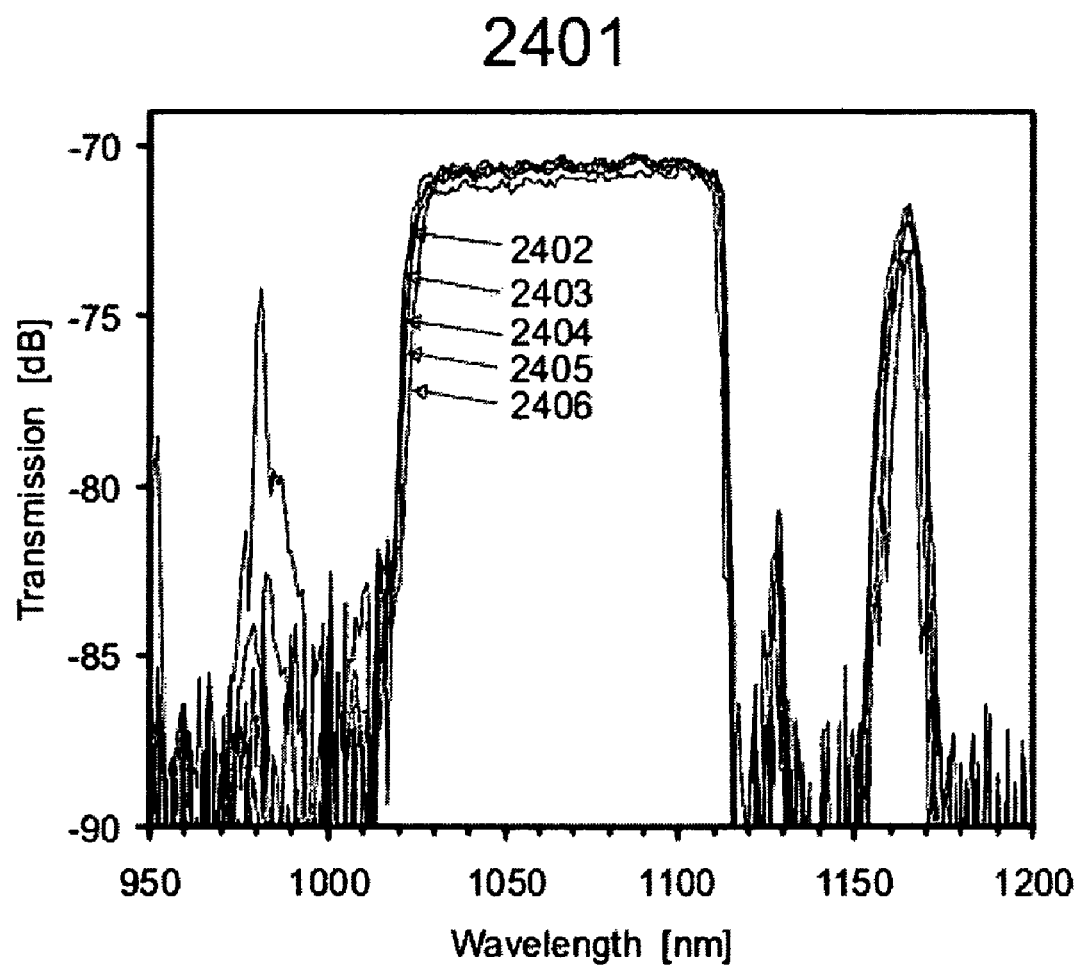
FIG. 24 shows transmission spectra of a fiber according to the present invention.
Figure 25:
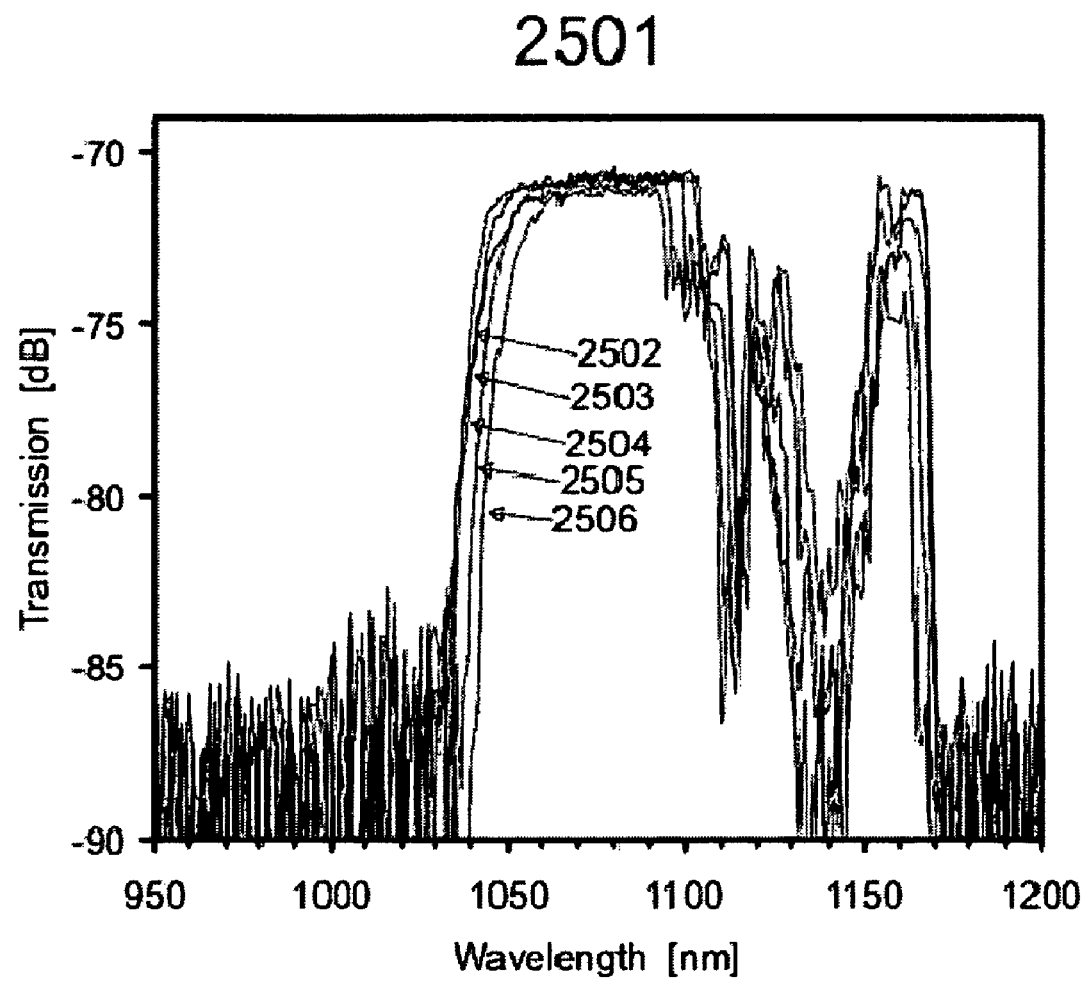
FIG. 25 shows transmission spectra of a coiled fiber according to the present invention for different coil diameters, when the fiber is coiled in one orientation relative to the optical resonant structures.
Figure 26:
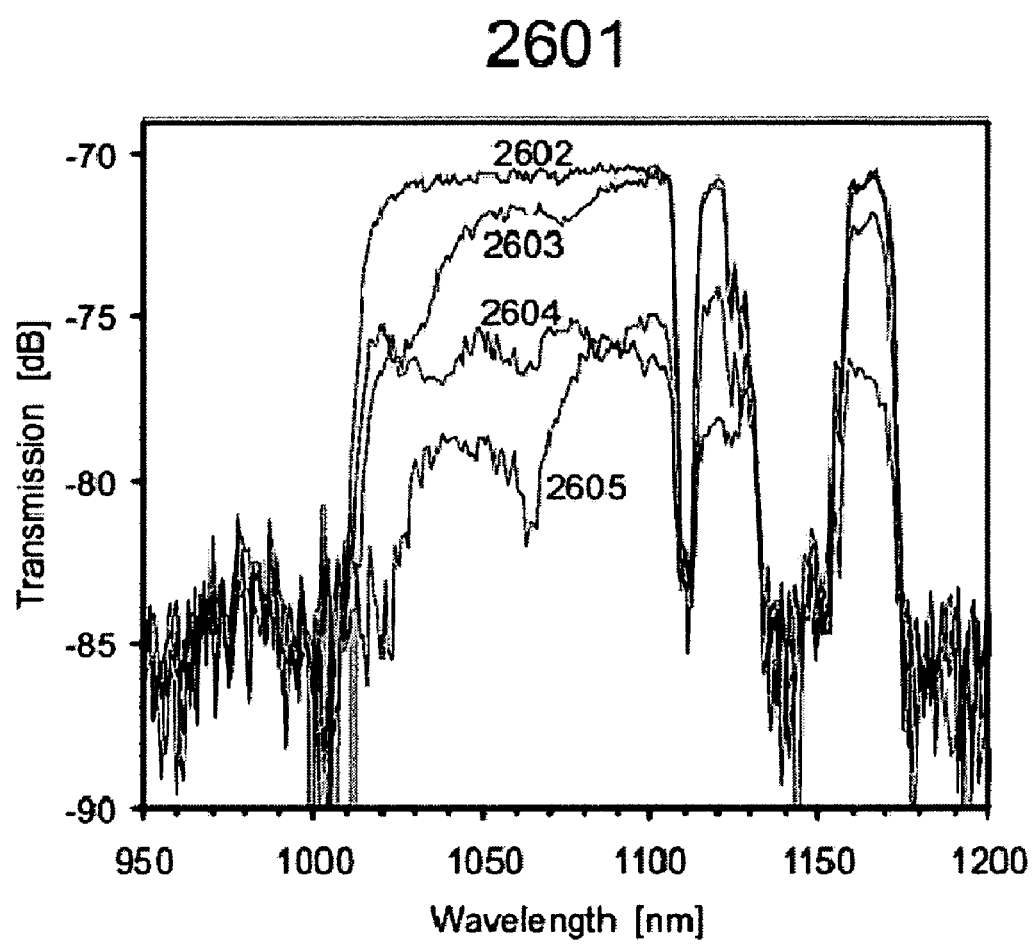
FIG. 26 shows transmission spectra of a coiled fiber according to the present invention for different coil diameters, when the fiber is coiled in an orientation different the coiling orientation of FIG. 25.
Figure 27:
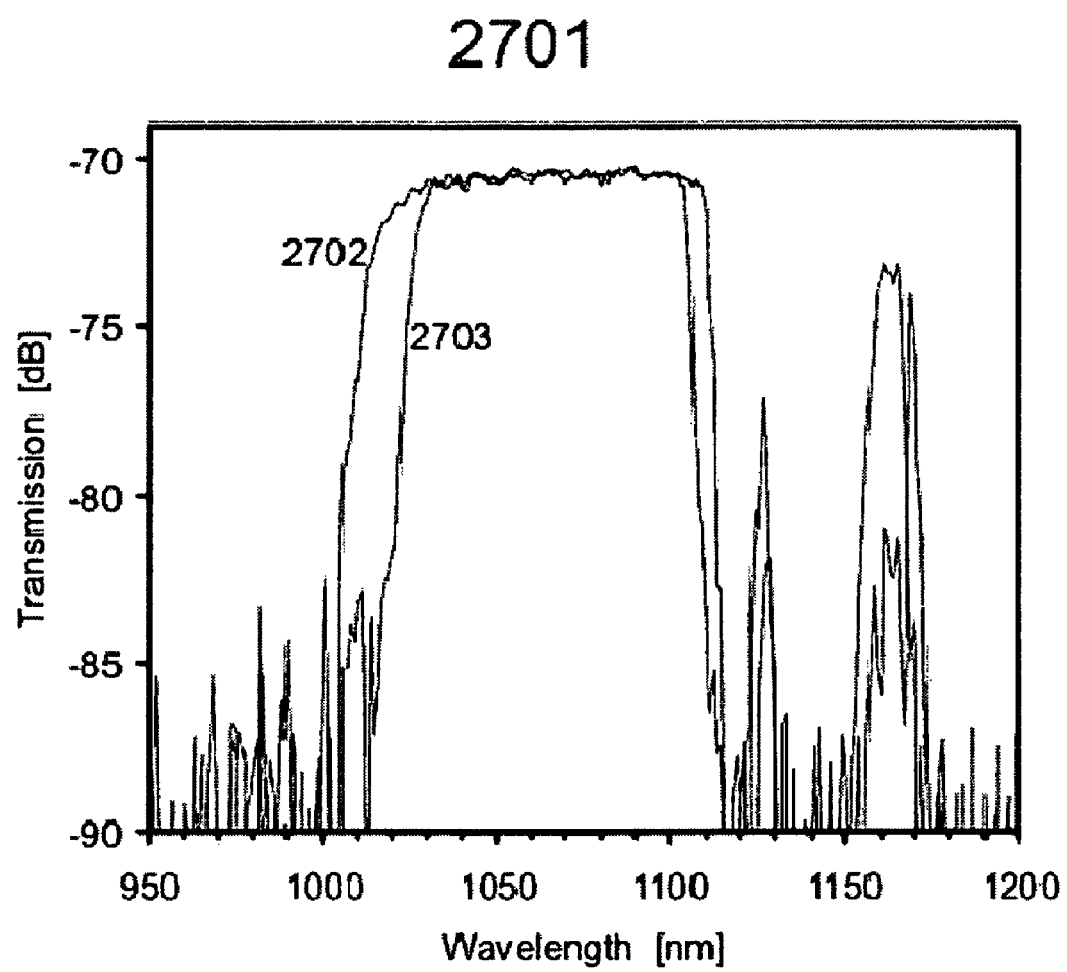
FIG. 27 shows a plot of the transmission spectrum of a fiber according to the invention for two orthogonal input polarizations when the fiber is coiled in one orientation.

In the graph 2401 of FIG. 24, the fiber is coiled in the first arrangement and the different curves showing the transmission spectrum of the fiber depicted in FIG. 23 for different coil radii: 22 cm (2402), 25 cm (2403), 30 cm (2404), 35 cm (2405), 40 cm (2406). As seen the fiber is highly bend insensitive even when coiled to a coil diameter of down to 22 cm. When the fiber is not coiled according to the first arrangement, the change in transmission spectra shows a more pronounced dependence on the coil diameter. In FIGS. 25 and 26 is shown the transmission spectra when the optical fiber is coiled in an arrangement that differs from the first arrangement. The diameter of the coil decrease from 40 cm to 22 cm in curves 2502 (40 cm), 2503 (35 cm), 2504 (30 cm), 2505 (25 cm), 2506 (22 cm) and from 40 cm to 25 cm in curves 2602 (40 cm), 2603 (35 cm), 2604 (30 cm), and 2605 (25 cm). The change in the shape of the transmission spectrum seen in FIG. 25 leads to a narrowing of the central peak where the peak is at its widest form when the coil diameter is 40 cm. In FIG. 26, not only a narrowing but also a more general increase in the transmission loss in the fiber FIG. 27 shows the transmission spectrum 2701 of the fiber according to the invention for two orthogonal input polarizations 2702, 2701 when the fiber is coiled according to the first arrangement. The optical fiber exhibits polarizing properties near the short- and long-wavelength edge of the transmission window.

Figure 28:
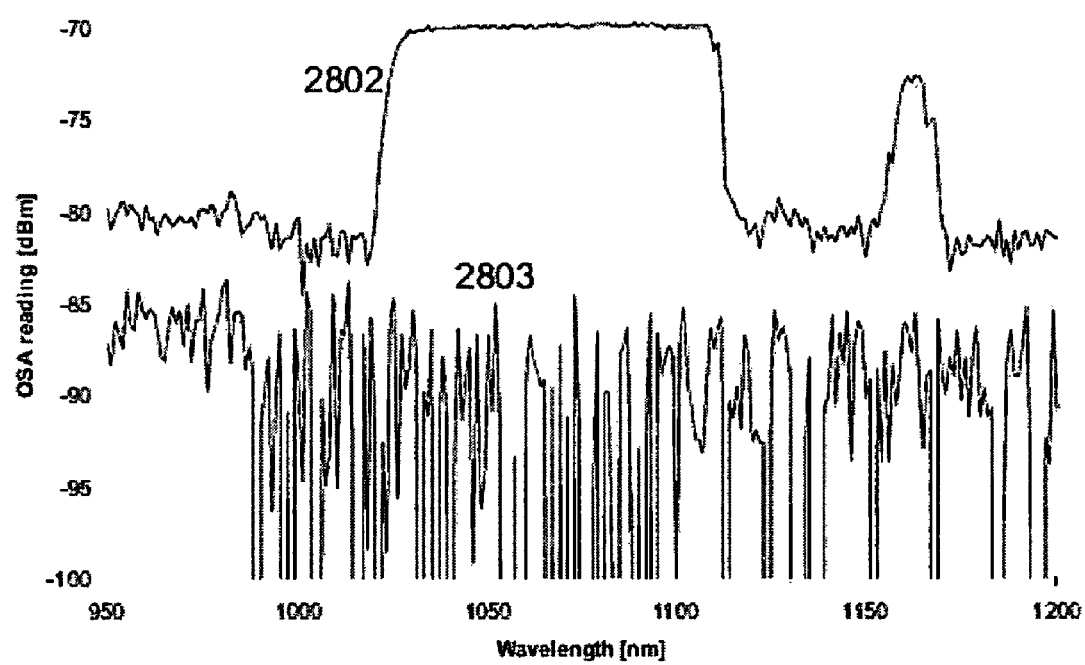
FIG. 28 shows a plot of the measured polarization crosstalk of a fiber according to the invention.

Fibers according to the present invention may have low cross talk between the two polarizations of light propagating through the fiber in a core region mode. FIG. 28 shows a plot 2801 of the measured polarization cross-talk 2802, 2803 of the fiber according to the invention. This indicates good PM properties of the fiber.

Figure 29:
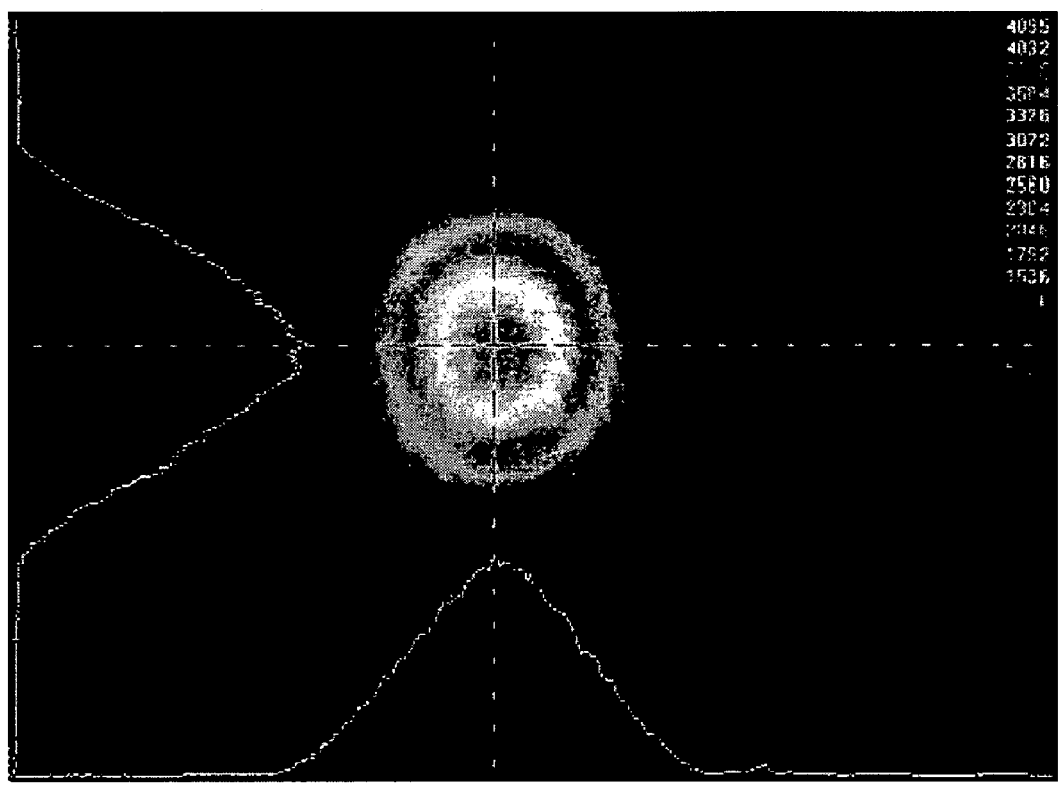
FIG. 29 shows an image of the near field of a guided mode.

A guided mode in the core region of a single mode configuration of the fiber having two co-linear arranged optical resonant structures may be close to being centro-symmetric. An image 2901 of the near field of the guided mode at 1064 nm wavelength is depicted in FIG. 29. The mode-field diameter is larger than 25 μm and the fiber supports single-mode transmission.

EXAMPLE 9

The optical fiber can be made active by adding an active element, such as the Rare Earth elements Thulium, Ytterbium or Erbium, to e.g. the core region. The Rare Earth elements can be pumped to an excited state by pump light propagating in the inner cladding region. With reference to FIGS. 36 to 39, a Large Mode Area optical fiber 3601, 3701, 3801, 3901 with an active region is described. The optical fiber has a first and a second optical resonant structure that connects the core region 3603, 3703, 3803, 3903 and a sink 3602, 3702, 3802, 3902. The spectral width of the transmission window can be engineered by proper scaling of the diameter of the inner cladding features. In the hexagonal fiber design illustrated in FIGS. 36 to 39, the core region 3603, 3703, 3803, 3903 is defined by a plurality of third inner cladding features 3604, 3704, 3804, 3904 surrounding a 7-cell core comprising an active region 3607, 3707, 3807, 3907 comprising inner cladding basis material doped with an active element. A silica material can be used as inner cladding basis material and the active material can be a Rare Earth element. But in principle can any material suitable for producing waveguides, such as substantially transparent polymer materials, and any suitable active material be used. The optical resonant structures are both defined by five up-doped high-index inner cladding features 3605, 3606, 3705, 3706, 3805, 3806, 3905, 3906 with first inner cladding features 3605, 3705, 3805, 3905 arranged along a first line, and second inner cladding features 3606, 3706, 3806, 3906 arranged along a second line. The lines are collinear and intersect the centre of the core region. The third inner cladding features 3604, 3704, 3804, 3904 are voids with a diameter to pitch ratio sufficiently low so that the fiber core can have a large mode area while still guiding an optical signal in single-mode operation. The active region 3607, 3707, 3807, 3907 comprising inner cladding basis material doped with an active element can take different forms. In an optical fiber with a hexagonal arrangement of the inner cladding features, the active region may comprise a Rare Earth element doped active elements. The active elements may be within the core, such as on the central lattice position or on all 7 lattice positions in a 7 cell core. In one arrangement, the active region is arranged to reduce the modal overlap with the fundamental modes and/or the field of the optical signal guided through the fiber core. The fiber design of FIG. 36 has an active region that holds 6 active features 3607 arranged on the core lattice positions surrounding the central core lattice position, while the fiber design of FIG. 38 has an active region that holds 3 active features 3807 arranged on core lattice positions in a line across the core region. The active region can also be formed as a ring 3707 in the core region as in the fiber design of FIG. 37. A reduced modal overlap with the active region can also be realized by arranging the active region in the inner cladding as shown in the fiber design of FIG. 39 where the first ring of third inner cladding features comprises voids each surrounded by a ring of active material.

The invention claimed is:

1. An optical fiber adapted for suppression of higher order modes (HOM) and/or for guiding light in a narrow spectral wavelength range, said optical fiber comprising:
    an axial direction, a cross section perpendicular to said axial direction, and
    a core region extending along said axial direction, said core region being adapted to guide an optical signal;
    a cladding region surrounding said core region, said cladding region comprising an inner cladding region comprising an inner cladding basis material in which inner cladding features extending along said axial direction are defined,
    said inner cladding features comprising a plurality of first inner cladding features comprising a first material and having a first refractive index profile, a first cross sectional shape and a first normalized frequency parameter relative to said inner cladding basis material, wherein
    said plurality of first inner cladding features forms a first cross sectional extending optical resonant structure connecting said core region to a first light sink, wherein
    said inner cladding features further comprises a plurality of second inner cladding features comprising a second material and having a second refractive index profile, a second cross sectional shape and a second normalized frequency parameter relative to said inner cladding basis material, wherein said plurality of second inner cladding features forms a second cross sectional extending optical resonant structure connecting said core region to a second light sink, and wherein either
    said first refractive index profile differs from said second refractive index profile; and/or
    said first cross sectional shape differs from said second cross sectional shape, and/or
    said first normalized frequency parameter differs from said second normalized frequency parameter, and
    wherein said inner cladding features further comprises a plurality of third inner cladding features that comprise a third material and have a third refractive index profile and a third cross sectional shape, wherein said third inner cladding feature comprises a low index region, and wherein said low index region comprise a void.

2. The optical fiber according to claim 1, wherein the fiber is asymmetric such that there is no axis parallel to the axial direction of the fiber around which the fiber has a rotational symmetry.

3. The optical fiber according to claim 1, further comprising a first outer cladding region surrounding at least partly said inner cladding region, and wherein said first outer cladding region comprises said first and/or second light sink.

4. The optical fiber according to claim 1, wherein said first and/or second light sink comprises at least a first light absorbing region comprising a light absorbing medium, and wherein said first light absorbing region is at least partly located in said first outer cladding region or wherein said first light absorbing region is at least partly located in said inner cladding region.

5. The optical fiber according to claim 4, wherein said light absorbing region comprises at least one first inner cladding feature and/or at least one second inner cladding feature being doped with said light absorbing medium.

6. The optical fiber according to claim 5, wherein at least two substantially non-absorbing inner cladding features are arranged in between said core region and each of said inner cladding features being doped with said light absorbing medium.

7. The optical fiber according to claim 4, wherein said light absorbing medium comprises Samarium (Sm).

8. The optical fiber according to claim 1 adapted give a suppression of HOM in the range of about 3 dB/m to about 100 dB/m.

9. The optical fiber according to claim 3, where the refractive index of said first outer cladding region is higher than the effective refractive index of said inner cladding region.

10. The optical fiber according to claim 1, wherein said first inner cladding features are arranged to define at least a first transmission pass band in the fiber transmission spectrum by resonantly coupling light from at least a first core mode of said core region to said first light sink in at least two resonant wavelength ranges, and/or wherein said second inner cladding features are arranged to define at least a second transmission pass band in the fiber transmission spectrum by resonantly coupling light from at least a second core mode of said core region to said second light sink in at least two resonant wavelength ranges.

11. The optical fiber according to claim 10, wherein said first and second transmission pass bands are at least partially overlapping.

12. The optical fiber according to claim 10, wherein said first and second inner cladding features are arranged so that at wavelengths in a core mode suppression band the transmission loss of an optical signal propagating in said first core mode differs from the transmission loss of an optical signal propagating in said second core mode, wherein at least one of said first and second core modes is a higher order mode.

13. The optical fiber according to claim 10, wherein first and second inner cladding features are arranged to at wavelengths in a polarization mode suppression band resonantly couple different polarization modes of said core region to said first and second light sink, respectively.

14. The optical fiber according to claim 1, wherein said first optical resonant structure comprises first inner cladding features arranged substantially along at least a first line that extends from said core region to said first optical sink, or
wherein said second optical resonant structure comprises second inner cladding features arranged substantially along at least a second line that extends from said core region to said second optical sink.

15. The optical fiber according to claim 1, wherein said first optical resonant structure comprises first inner cladding features arranged substantially along two intersecting lines tangentially positioned in relation to said core region and optionally along said first line that extends from said core region, wherein said first line intersects said tangentially positioned lines, or
wherein said second optical resonant structure comprises second inner cladding features arranged substantially along two intersecting lines tangentially positioned in relation to said core region and optionally along said second line that extends from said core region,
wherein said second line intersects said tangentially positioned lines.

16. The optical fiber according to claim 1 wherein at least a part of said first, second, and third inner cladding features are arranged in a substantially hexagonal lattice.

17. The optical fiber according to claim 1 further comprising an active region comprising at least one active element and wherein said active region is at least partly comprised within said core region.

18. The optical fiber according to claim 17, wherein said plurality of inner cladding features providing resonant coupling of one or more higher-order modes (HOM) at a wavelength where the emission spectrum of said active element show a relatively strong signal.

19. The optical fiber according to claim 1 further comprising stress applying elements arranged to apply stress to said core region and/or said inner cladding features.

20. The optical fiber according to claim 19, wherein said stress applying elements comprises Boron (B) and/or Fluorine (F) doped silica.

21. The optical fiber according to claim 1, wherein the optical fiber is tapered from a first diameter to a second diameter over a tapering length.

22. An optical fiber system comprising
a. an optical fiber that is arranged in a coiled up arrangement over at least a part of its length, said optical fiber comprising the optical fiber according to claim 1;
b. a casing comprising at least one holding unit adapted to hold and maintain said optical fiber in said coiled up arrangement at least for a period of time; and
c. a coupling unit adapted to couple light into and/or out of said optical fiber.

23. The optical fiber system according to claim 22, wherein said coiled up arrangement of the optical fiber is such that the coil has a center, and wherein said first optical resonant structure is oriented substantially towards said centre of said coil, and wherein said optical fiber further comprises said second optical resonant structure, which is oriented substantially away from the centre of said coil.

24. The optical fiber system according to claim 22, wherein the optical fiber further comprises an active region comprising at least one active element and wherein said active region is at least partly comprised within said core region.

25. The optical fiber system according to claim 22 wherein said coiled up arrangement is such that the coil has a center, and wherein said first optical resonant structure is oriented substantially along the normal of the circumference defined by the coil.

26. A method for producing the fiber according to claim 1, comprising
providing a plurality of first rods comprising said first material and a plurality of second rods comprising said second material;
making a stack comprising at least one core rod for defining said core region and a plurality of rods for defining the inner cladding region comprising a plurality of said first and second rods,
optionally drawing said stack to a preform; and
drawing said stack or said preform or to said optical fiber;
wherein material from said first rods define said first inner cladding features and material from said second rods define said second inner cladding features in the drawn optical fiber.

* * * * *